(12) United States Patent
Ikeno et al.

(10) Patent No.: US 8,262,048 B2
(45) Date of Patent: Sep. 11, 2012

(54) DISPLAY SUPPORTS AND ELECTRONIC DEVICES INCLUDING SUCH DISPLAY SUPPORTS

(75) Inventors: Takahiro Ikeno, Seto (JP); Yoshinori Osakabe, Seto (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 912 days.

(21) Appl. No.: 11/691,474

(22) Filed: Mar. 26, 2007

(65) Prior Publication Data
US 2007/0228232 A1  Oct. 4, 2007

(30) Foreign Application Priority Data
Mar. 31, 2006  (JP) .................. 2006-100510

(51) Int. Cl.
*A45D 19/04* (2006.01)
*A47J 47/16* (2006.01)
*F16M 13/00* (2006.01)

(52) U.S. Cl. ........ 248/393; 248/371; 248/917; 248/919; 248/923

(58) Field of Classification Search .............. 248/456, 248/455, 454, 457, 917, 393, 371; 361/679.02, 361/679.01, 679.06, 724; 206/459.1, 775
See application file for complete search history.

(56) References Cited

U.S. PATENT DOCUMENTS

| | | | | |
|---|---|---|---|---|
| 4,669,694 A | * | 6/1987 | Malick | 248/397 |
| 5,168,426 A | * | 12/1992 | Hoving et al. | 361/679.09 |
| 5,317,422 A | | 5/1994 | Fujimoto | |
| 5,345,362 A | * | 9/1994 | Winkler | 361/679.06 |
| 5,633,782 A | * | 5/1997 | Goodman et al. | 361/679.41 |
| 6,201,690 B1 | * | 3/2001 | Moore et al. | 361/679.21 |
| 6,483,445 B1 | | 11/2002 | England | |
| 6,665,173 B2 | * | 12/2003 | Brandenberg et al. | 361/679.09 |
| 6,827,409 B2 | * | 12/2004 | Michael | 312/223.3 |
| 6,836,404 B2 | * | 12/2004 | Duarte | 361/679.09 |
| 6,971,622 B2 | * | 12/2005 | Ziegler et al. | 248/454 |
| 7,006,015 B2 | | 2/2006 | England | |

(Continued)

FOREIGN PATENT DOCUMENTS

JP   H04-349765 A   12/1992

(Continued)

OTHER PUBLICATIONS

User's Manual of Mitsubishi NR-VR800MCD/NR-VZ801MCD series, front and rear covers and pp. 10-11 (no date available).

(Continued)

*Primary Examiner* — Amy J Sterling
(74) *Attorney, Agent, or Firm* — Baker Botts L.L.P.

(57) ABSTRACT

A display support includes a display cover including a display cover surface and a guide groove; a display pivotally mounted by at least one support portion on the display cover, to pivot between a first position and a second position, at which second position the display forms an acute angle with the display cover surface; an input portion covered by the support portion, when the display is in the first position; and the guide groove configured to convey the at least one support portion from a first location to a second location as the display pivots on to the second position, such that at least one support portion uncovers the input portion when the at least one support portion is at the second location. An electronic device, such as a multifunction device includes a housing and a display support.

9 Claims, 22 Drawing Sheets

U.S. PATENT DOCUMENTS

| | | | |
|---|---|---|---|
| 2003/0109230 A1* | 6/2003 | Duarte et al. | 455/90 |
| 2005/0056750 A1* | 3/2005 | Lai et al. | 248/282.1 |
| 2006/0198094 A1* | 9/2006 | Kano et al. | 361/683 |

FOREIGN PATENT DOCUMENTS

| | | |
|---|---|---|
| JP | H06-244909 A | 9/1994 |
| JP | H06-343117 A | 12/1994 |
| JP | H07-078196 A | 3/1995 |
| JP | H10-214135 A | 8/1998 |
| JP | H10-243065 A | 9/1998 |
| JP | 2000-232503 A | 8/2000 |
| JP | 2000-232544 A | 8/2000 |
| JP | 2002533821 A | 10/2000 |
| JP | 2001292213 A | 10/2001 |
| JP | 2002111835 A | 4/2002 |
| JP | 2003032533 A | 1/2003 |
| JP | 2005124074 A | 5/2005 |
| JP | 2005175800 A | 6/2005 |
| JP | 2005175802 A | 6/2005 |

OTHER PUBLICATIONS

Japanese Patent Office, Japanese Office Action issued in corresponding Japanese Application No. 2006-100510, dated Jan. 27, 2009.

* cited by examiner

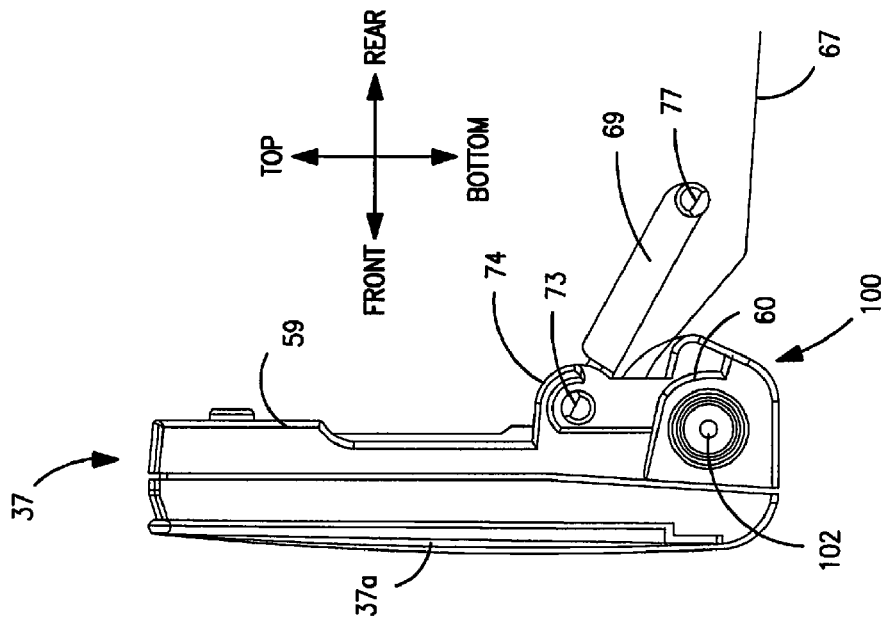
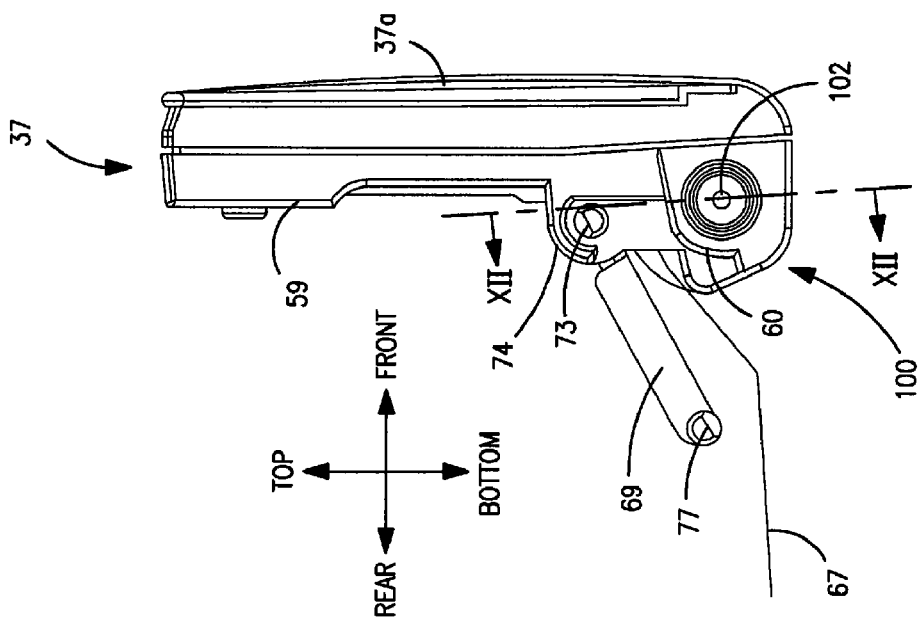
FIG. 10A
FIG. 10B

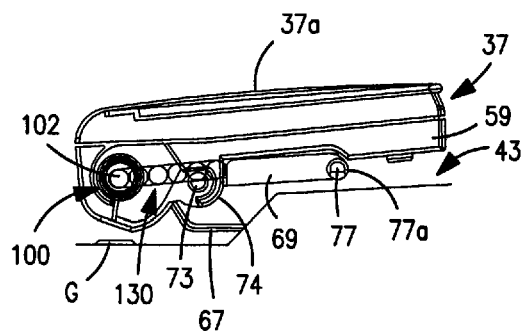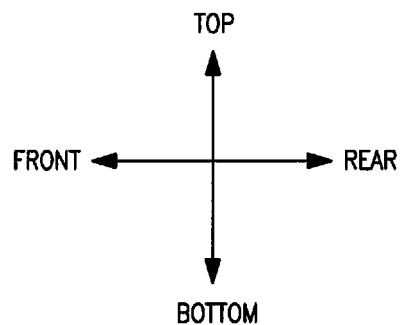
FIG. 18A
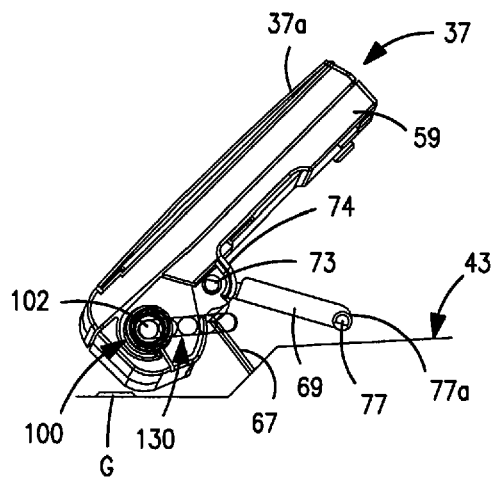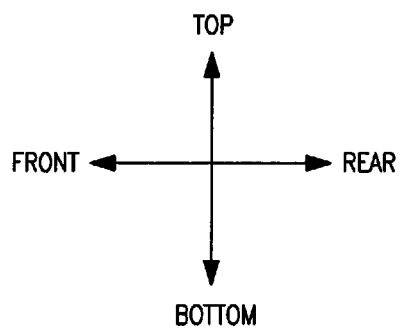
FIG. 18B
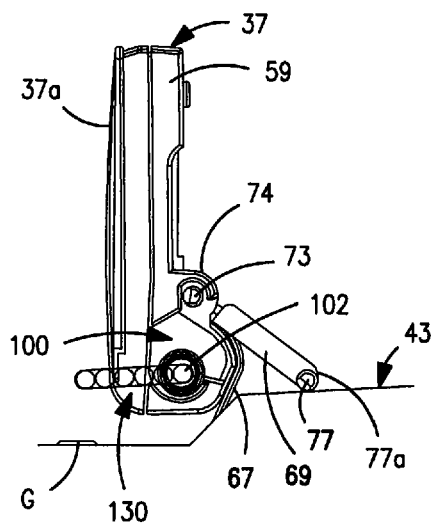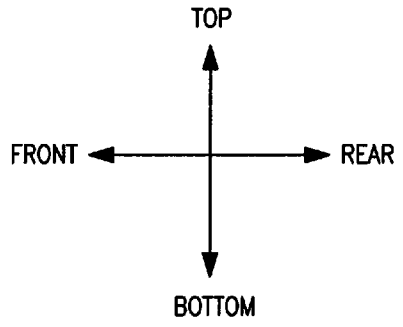
FIG. 18C

DISPLAY SUPPORTS AND ELECTRONIC DEVICES INCLUDING SUCH DISPLAY SUPPORTS

CROSS-REFERENCE TO RELATED APPLICATION

This present application claims priority from Japanese Patent Application No. JP-2006-100510, which was filed on Mar. 31, 2006, the disclosure of which is incorporated herein by reference in its entirety.

BACKGROUND OF THE INVENTION

1. Field of the Invention

The present application relates generally to electronic devices, such as multifunction devices, having a display for displaying data, such as image data or text data.

2. Description of Related Art

Single-function electronic devices for image recording, such as inkjet printers, copier machines, and facsimile machines, and multi-function electronic devices which perform a plurality of different functions, such as printing, copying, scanning, or facsimile functions, or any combination thereof, are known in the art. Referring to FIG. 20, one known electronic device includes a display 137 which has a display surface 137A for displaying a variety of data, such as image data and text data, and a control G which includes a plurality of control keys 139 which allow a user to input instructions along the surface of an electronic device housing 151.

Referring to FIGS. 21(a)-21(c), in another known electronic device, such as the electronic device described in Japanese Patent Application Publication No. 2005-124074, a display 237 may comprise a display surface 237A, and the display surface 237A may be mounted opposite the control G which includes a plurality of control keys 239 which allowing the user to input instructions on a device housing 251. The display 237 may be configured to rotate between a lowered position in which the display 237 covers the control G, and a raised position in which the control G is exposed.

In this known electronic device, the area needed to mount the display 237 and the control G on the housing 251 is a mounting area A2, which is about equal to the area of the surface on which the display surface 237A of the display 237 is mounted. The mounting area A2 is also is about equal to a projected area S4 on which the display 237 is mounted when the display 237 is lowered, i.e., the display 237 and the control G may be mounted within the range of the projected area S4.

Referring to FIGS. 22(a) and 22(b), in yet another known electronic device, such as the electronic device described in Japanese Patent Application Publication No. 2002-533821, the control G includes a plurality of control keys 339, and the control G is mounted on the surface of a device housing 351, and a display 337 may slide relative to the surface of the device housing 351. Moreover, the display 337 includes a display surface 337A mounted on the device housing 351 facing out from the device housing 351, such that display surface 337A does not face the control G. Consequently, the display 337 slides between a first position in which the control G is covered, and a second position in which the control G is exposed.

In this known electronic device, the control G is covered by the display 337 when the display 337 is in the first position, and a mounting area A3 is the area needed to mount the display 337 and the control G on the surface of the housing 351. The mounting area A3 is about equal to the area of the surface on which the display surface 337A of the display 337 is mounted. The mounting area A3 also is about equal to a projected area S7 on which the display 337 is mounted when the display 337 is lowered, i.e., the display 337 and the control G may be mounted within the range of the projected area S7.

In the known electronic devices which include displays 237 and 337, respectively, the displays 237 and 337 are mounted three-dimensionally, such that each display 237 and 337 may cover the control G. Consequently, the displays 237 and 337 and the control G may be mounted using less space than the known electronic device display 137 and the control G are mounted in a plane on the surface of the housing 151 of the electronic device.

Nevertheless, in the known electronic device which includes display 237, when the display 237 is lowered, the display 237 is folded over the device housing 251 with the display surface 237A facing the control G, which makes it difficult for the user to view the control G and the display surface 237A from the viewpoint 202A and viewpoint 202B.

Moreover, as shown in FIG. 21(c), when a recording medium feed 300 is positioned behind the display 237 with the display 237 raised, the recording medium feed 300 is covered by the display 237, which prevents the user from using the recording medium feed 300, i.e., a projected area S6 extends beyond the range of the mounting area A2 and overlaps with the mounting range for the recording medium feed 300. In this case, when the user attempts to load the recording medium feed 300 with a recording medium, the user may not be able to view the recording medium feed 300, such that user first must move the display 237 to the position shown in either FIG. 21(a) or FIG. 21(b) in order to view the recording medium feed 300. The user then has to return the display 237 to the position shown in FIG. 21(c) after the user loads the recording medium feed 300.

In the known electronic devices which use display 337, the user may view the display surface 337A regardless of whether the display 337 is in the first position or in the second position, and the control G is exposed even when the display 337 is in the second position, such that the user readily may use the control G. Nevertheless, when the display 337 is in the second position, a projecting area S8 substantially overlaps into the range of the mounting area A3, such that the space occupied by the display 337 is not only the mounting area A3, and the projected area S8 also is considered to be space occupied by the display 337. Consequently, the recording medium feed 300 may be covered by the display 337.

SUMMARY OF THE INVENTION

Therefore, a need has arisen for multifunction devices which overcome these and other shortcomings of the related art. A technical advantage of the present invention is that a display may be configured to rotate between a lowered position and a raised position, and a display surface of the display may be exposed independent of the position of the display. Another technical advantage of the present invention is that a range of rotation of the display may not intersect with a range of rotation of an upper body of the electronic device, such that when the upper body and the display rotate they do not contact each other.

According to an embodiment of the present invention, a display support may comprise a display cover comprising a display cover surface and at least one guide groove formed therein; a display pivotally mounted by at least one support portion on the display cover, to pivot between a first position and a second position, at which second position the display forms an acute angle with the display cover surface; an input portion covered by the at least one support portion, when the display is in the first position; and the at least one guide groove configured to convey the at least one slide shaft from a first location to a second location as the display pivots on to the second position, such that at least one support portion uncovers the input portion when the at least one support portion is at the second location. An electronic device may comprise a housing and such a display support. Further, each of the at least one guide groove may comprise a conveyance path which is substantially parallel to the display cover surface. Moreover, each of the at least one guide groove may comprise a plurality of discrete locations between the first location and the second location. In addition, the at least one support portion may comprise a slide shaft and urging means and the at least one guide groove comprising a plurality of depressions, such that the urging means urges the slide shaft into at least one of the plurality of depressions.

According to another embodiment of the present invention, a display support may comprise a display cover comprising at least one guide groove formed therein; a display pivotally mounted by at least one support portion on the display cover, to pivot between a first position and a second position; an input portion for controlling the display and covered by the at least one support portion, when the display is in the first position; and the at least one guide groove configured to convey the at least one support portion from a first location to a second location as the display pivots on to the second position, such that at least one support portion uncovers the input portion when the at least one support portion is at the second location. An electronic devices may comprise a housing and such a display support.

According to still another embodiment of the present invention, a display support may comprise a display cover comprising at least one guide groove formed therein; a display pivotally mounted by at least one support portion on the display cover, to pivot between a first position and a second position; an input portion covered by the at least one support portion, when the display is in the first position; and the at least one guide groove configured to convey the at least one support portion from a first location to a second location as the display pivots on to the second position, such that at least one support portion uncovers the input portion when the at least one support portion is at the second location, and each of the at least one guide groove further comprising a plurality of discrete locations between the first location and the second location. An electronic devices may comprise a housing and such a display support. Further, the at least one support portion may comprise a slide shaft and urging means, such that the urging means urges the slide shaft to engage at least one of the plurality of discrete locations.

According to an embodiment of the present invention, an electronic device, such as a multifunction device, comprises a housing which comprises a housing surface. The electronic device also comprises an input positioned on the housing surface, and a display configured to rotate between a lowered position and a raised position. The display comprises a display surface configured to display information. Moreover, when the display is in the lowered position the display is supported by the housing surface, at least one portion of the input is covered by the display, and the display surface is exposed, and when the display is in the raised position the at least one portion of the input and the display surface are exposed.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the features and technical advantages thereof, reference now is made to the following descriptions taken in connection with the accompanying drawings.

FIG. 10(a) is a right side view of the LCD device of FIGS. 9(a) and 9(b).

FIG. 10(b) is a left side view of the LCD device of FIGS. 9(a) and 9(b).

FIG. 18(a) is a cross-sectional view of FIG. 17(a) taken along the line XVIII(a)-XVIII(a).

FIG. 18(b) is a cross-sectional view of FIG. 17(b) taken along the line XVIII(b)-XVIII(b).

FIG. 18(c) is a cross-sectional view of FIG. 17(c) taken along the line XVIII(c)-XVIII(c).

DETAILED DESCRIPTION OF THE EMBODIMENTS

Figure 1:
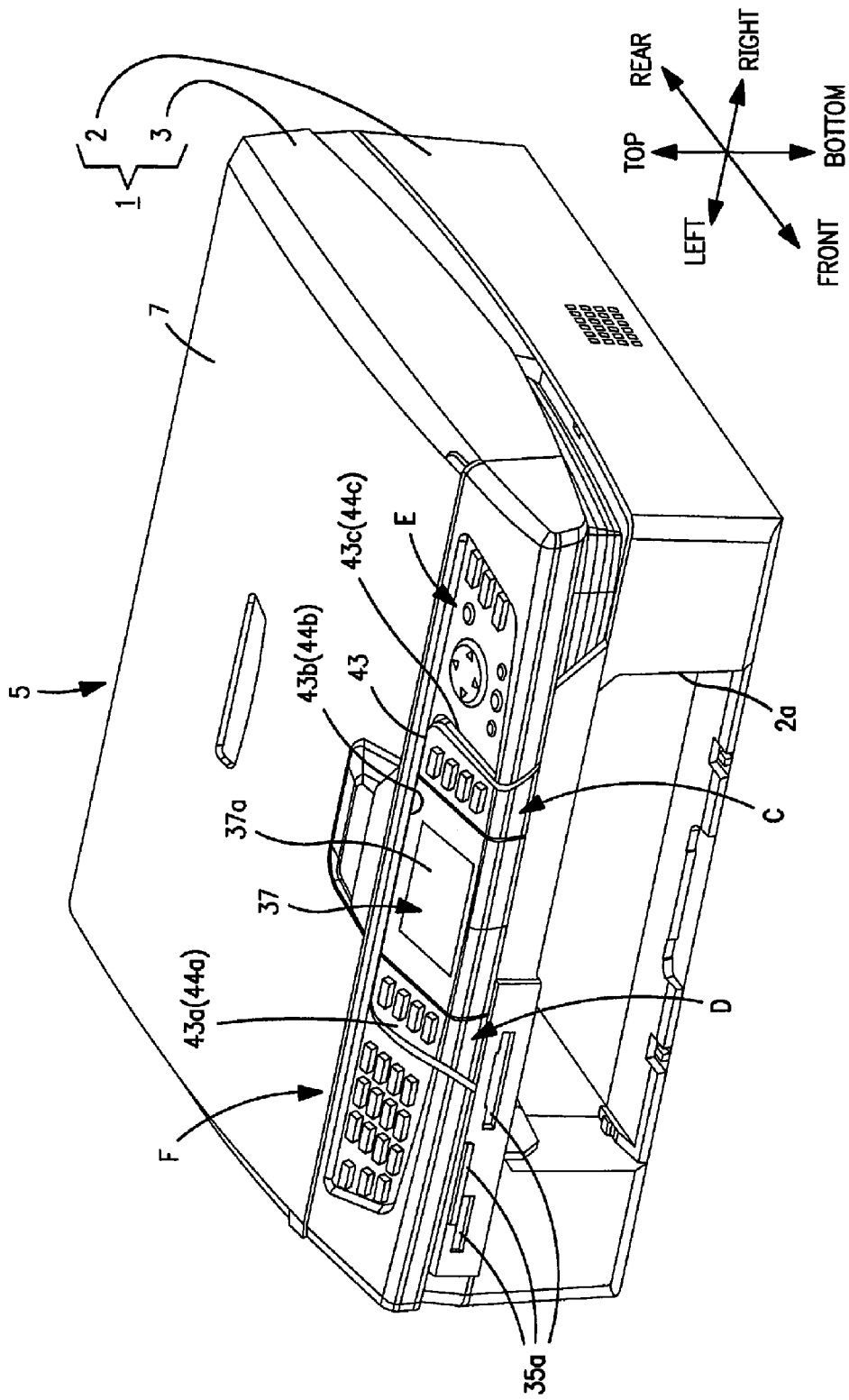
FIG. 1 is a perspective view of an electronic device, such as a multifunction device, according to an embodiment of the present invention.

Embodiments of the present invention and their features and technical advantages may be understood by referring to FIGS. 1-19(*c*), like numerals being used for like corresponding portions in the various drawings.

Referring to FIGS. 1-5, an electronic device 1 may be a multi function device ("MFD") which is configured to perform a plurality of functions, such as a printer function, copier function, scanner function, or a facsimile function, or any combination thereof. In the embodiment shown in FIGS. 1 and 2, electronic device 1 may comprise a device body comprising an injection-molded synthetic resin.

The device body may comprise a lower body 2 and an upper body 3 mounted to a topside of the lower body 2 via a pivot (not shown), such that the upper body 3 may rotate relative to one end of the lower body 2. For example, an opening 2*a* may be formed on the front side of the lower body 2, and the pivot may act as the axis of rotation for the upper body 3 and may be positioned on the left side flank of the lower body 2. The upper body 3 may be held in the open position by a prop 6 mounted on the top of the lower body 2.

An image reading device 5 may be mounted in the upper body 3 and may be used when performing the copy function, the scanner function, or the facsimile function. The image reading device 5 may comprise a glass plate (not shown) where documents may be positioned by opening a cover 7, and a contact image sensor ("CIS") for reading documents positioned on the underside of the glass plate. The contact image sensor 8 may move reciprocally along a guide shaft 9 which extends orthogonally to the recording medium in FIG. 5. The rear end of the cover 7 may comprise a pivot (not shown), such that the cover 7 may rotate in the up-down direction relative to the upper body 3 around the pivot.

An ink reserve 11 is mounted on one side of the lower body 2, and ink cartridges (not shown) may be mounted into and removed from the ink reserve 11. For example, the ink cartridges may include ink of different colors, e.g., black (Bk), cyan (C), magenta (M), and yellow (Y). Each ink cartridge may be in fluid communication with an inkjet recording head 14 on a recorder 12 via a flexible ink feed pipe.

The bottom of the lower body 2 may comprise a feed cassette 15 which may store a plurality of sheets of a recording medium P. The feed cassette 15 may be pushed into or pulled out of the opening 2*a*. The feed cassette 15 may store recording medium P of an A4 size, a letter size, a legal size, a postcard size, and the like, such a width of the recording medium P extending orthogonally to the feed direction, e.g., the direction of arrow A.

A slanted separator 16 for separating recording medium may be positioned at the rear of the feed cassette 15. The slanted separator 16 may protrude from the center of the recording medium P in the width direction, and may form a convex curve on a plane that retreats towards the left and right edges of the recording medium P in the width direction. An elastic separator pad (not shown) which promotes separation when the pad contacts the edge of the recording medium P may be mounted in the center of the recording medium P in the width direction.

Moreover, the base end of a feed arm 17*a* of a means for feeding 17 may be mounted on a main frame 21 positioned in the lower body 2, such that the feed arm 17*a* may rotate in the up-down direction. A feed roller 17*b* may be mounted on the tip of the feed arm 17*a*, and may be rotated by a driving force via a gear transmission mechanism 17*c* mounted in the feed arm 17*a*. The elastic separator pad between the feed roller 17*b* and the slanted separator 16 feeds the recording medium P in the feed cassette 15 one sheet at a time. The recording medium P, having been separated to proceed in the feed direction, is fed to a recorder 12 mounted above the feed cassette 15 via a conveyer route 18 comprising a path which has a partial U-shape on its side. The conveyer route 18 may be formed in the gap between a first conveyer 18*a*, which comprises the outer edge of the U-shape, and a second conveyer 18*b*, which comprises the inner edge of the U-shape.

Figure 5:
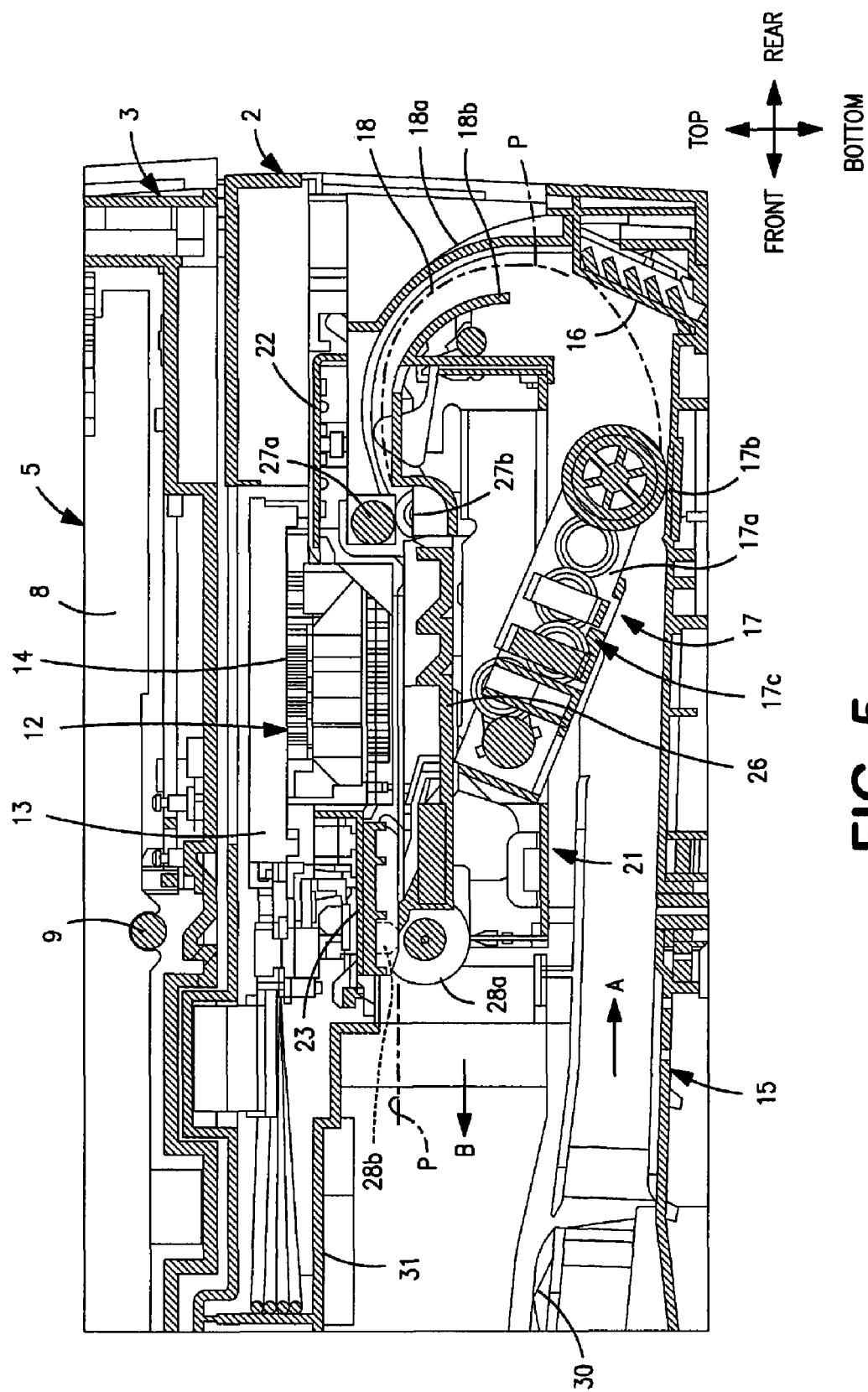
FIG. 5 is a partially magnified, cross-sectional view of a recorder and a recording medium feed of the electronic device of FIG. 1.

Referring to FIG. 5, the recorder 12 may be supported by the main frame 21 and pair of lateral side boards (not shown), and may be formed between a first guide portion 22 and a second guide portion 23. A carriage 13 in the recorder 12 may comprise an inkjet recording head 14, and may slide freely across the first guide portion 22 upstream and the second guide portion 23 downstream in a delivery direction, e.g., in the direction of arrow B.

A timing belt (not shown) may be used to move the carriage 13 reciprocally, and the timing belt may extend in the main scanning direction on the top of the second guide portion 23, and a carriage motor (not shown) may drive the timing belt and may be affixed to the underside of the second guide portion 23.

A flat platen 26 may extend in the left-right direction to face the underside of the recording head 14 in the carriage 13, and may be affixed to the main frame 21 between the guide portions 22 and 23.

Figure 2:
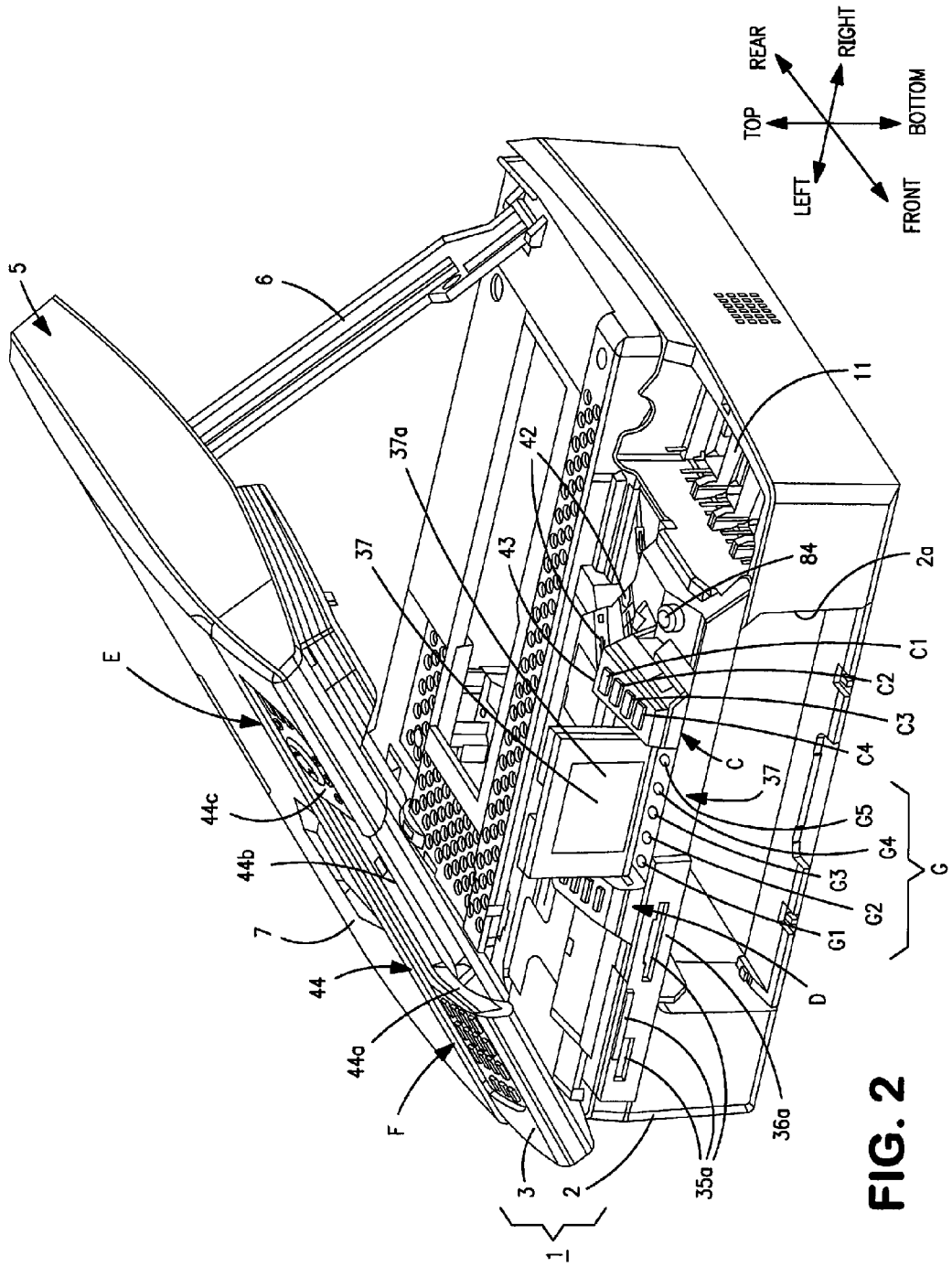
FIG. 2 is a perspective view of the electronic device of FIG. 1, in which an upper body of the electronic device is separated from a lower body of the electronic device.
Figure 3:
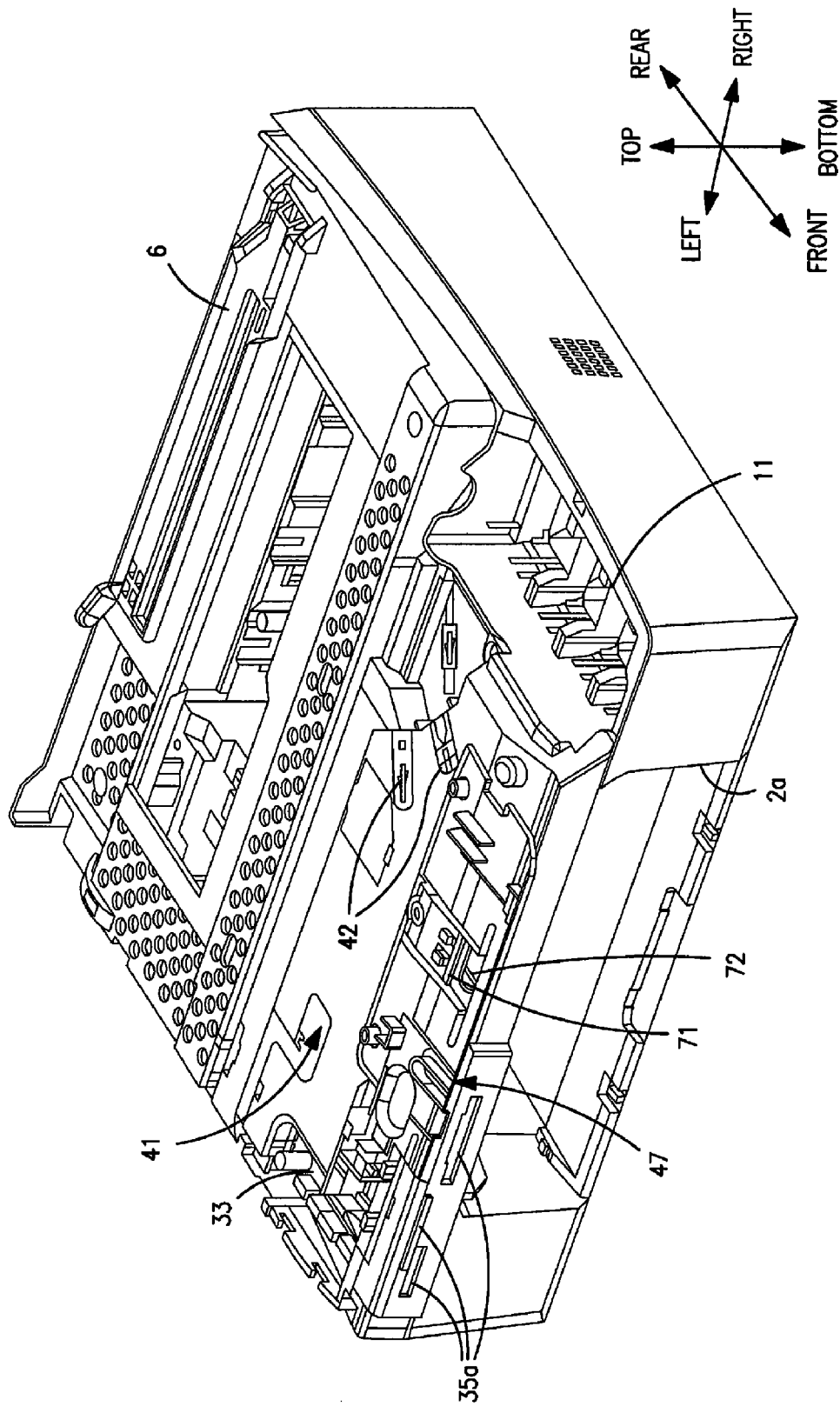
FIG. 3 is a perspective view of the electronic device of FIG. 1 with the upper body and a switch board of the electronic device removed.

As shown in FIG. 2, a drive roller 27*a* and a nip roller 27*b* that is pressed upwards against this drive roller 27*a* may be positioned upstream from the feed direction of the platen 26 as registration rollers which transport the recording medium P to the underside of the recording head 14. Moreover, a pair of delivery rollers (not shown) comprising a delivery roller 28*a* which is driven to feed recording medium P in the delivery direction after it has passed through the recorder 12, and a spur roller 28*b* mounted above the delivery roller 28*a*, may be mounted downstream from the feed direction of the platen 26.

A delivery tray 30 to which recording medium P is delivered after recording by the recorder 12 may be mounted on top of the feed cassette 15, and a delivery opening connecting to the delivery tray 30 may be formed in a position corresponding to the opening 2*a* on the front of the lower body 2. Moreover, a partition 31 may comprise a synthetic resin and may cover the top of the delivery tray 30. The partition 31 may be formed as a unit with the lower body 2 in the space between the bottom of the guide portion 23 on the downstream side of the delivery direction and the delivery opening on the front edge of the lower body 2.

Figure 4:
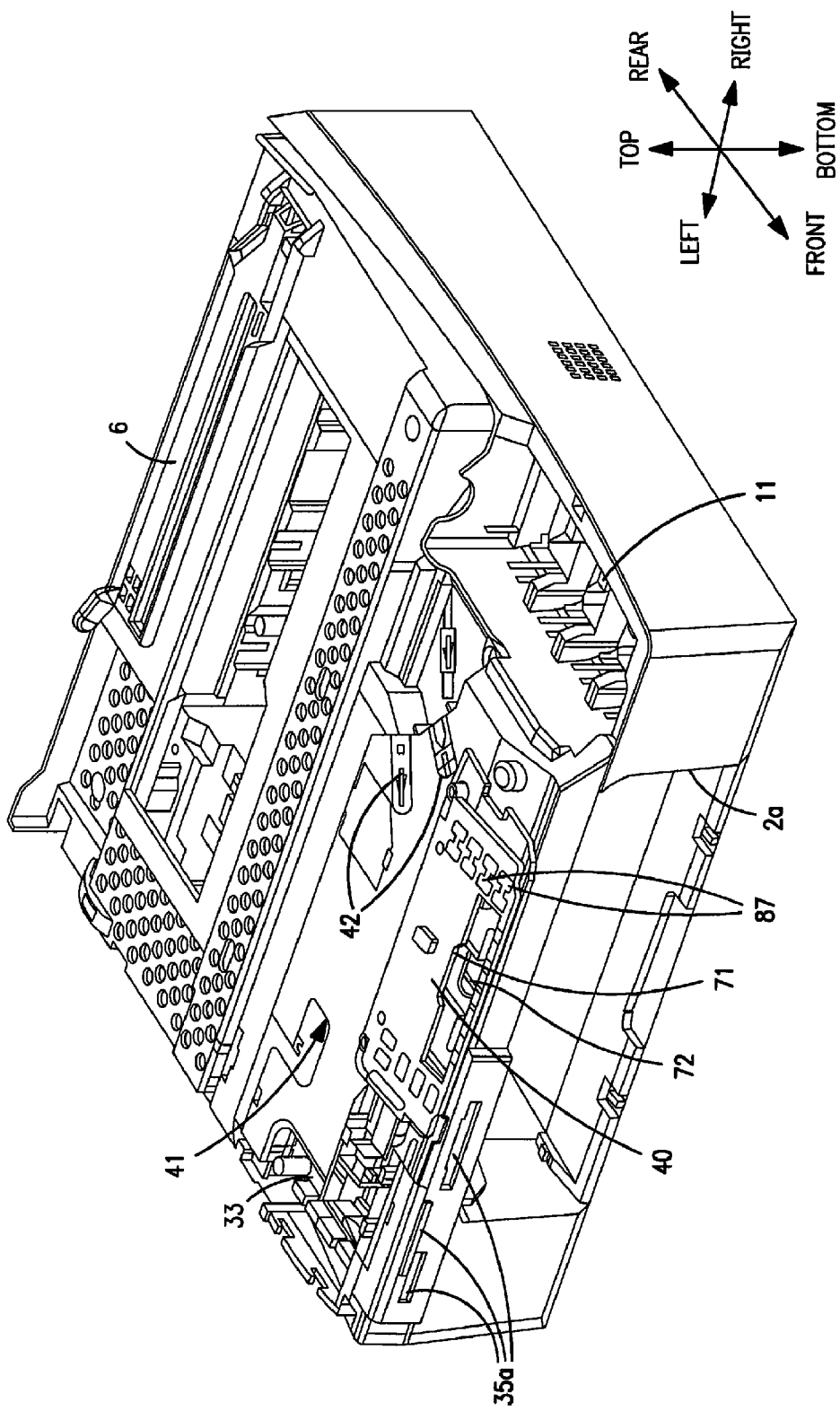
FIG. 4 is a perspective view of the electronic device of FIG. 3 with the switch board included.
Figure 6:
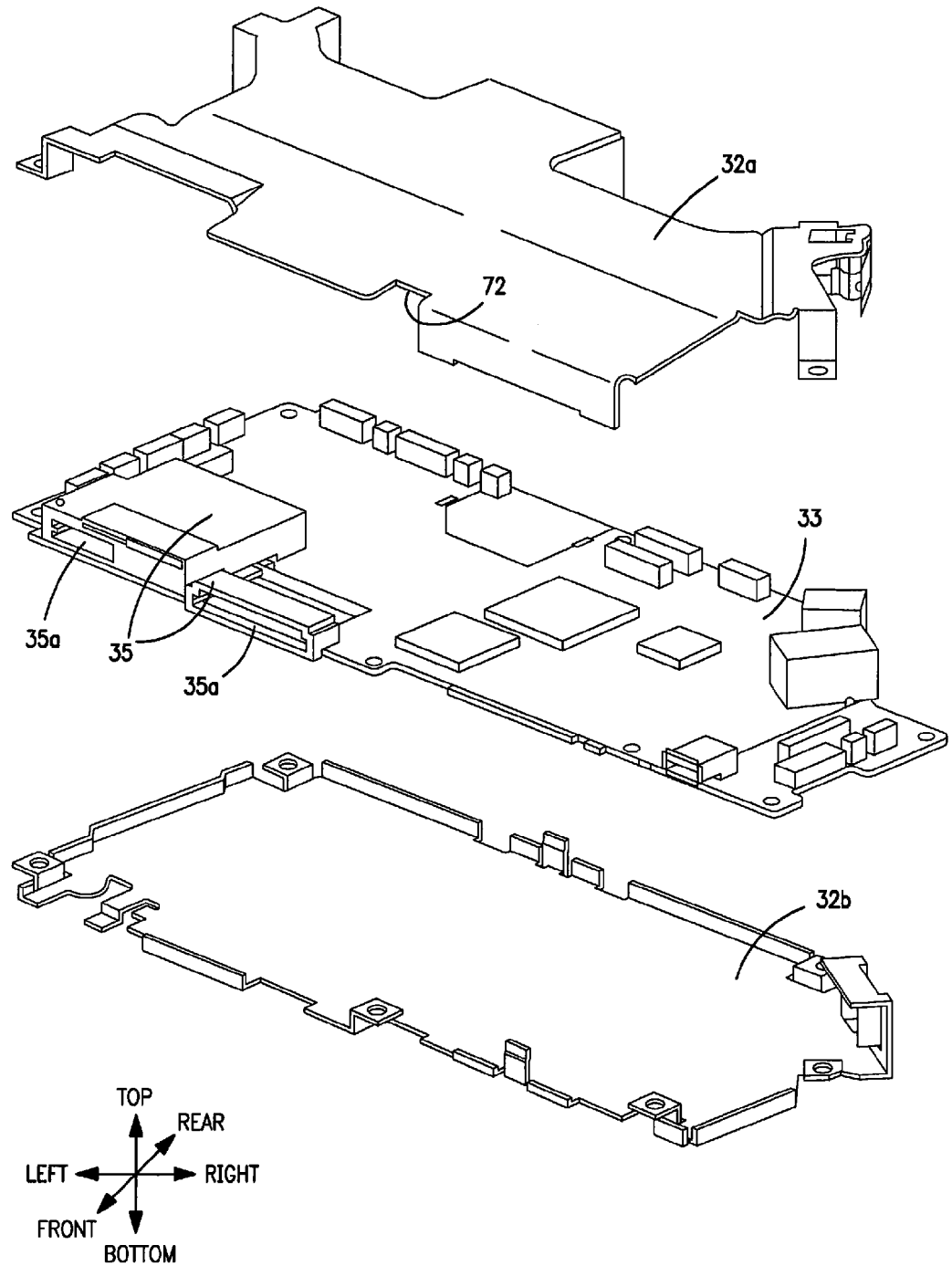
FIG. 6 is an exploded, perspective view of a main control board and a shield case of the electronic device of FIG. 1.

Referring to FIG. 6, a main control board 33 and the recorder 12 may be positioned on top of the partition 31 for facsimile transmission and the like. The main control board 33 may be covered in a shield case comprising an upper and a lower pair of an iron sheet metal 32*a* and 32*b*, and may be affixed to the lower sheet 32*b* by a screw. The lower sheet 32*b* may affixed to the partition 31 by a screw. An upper cover 41 may comprise a synthetic resin may be positioned over the shield case. Referring to FIG. 4, a switch board 40 for the operating switches C, D and G may be affixed to the rear of the display cover 43 with the switches C, D, and G. When the display cover 43 is attached to the upper cover 41, the switchboard 40 is affixed between the upper cover 41 and the display cover 43.

Moreover, a plurality of media connectors 35, each having a slot 35a for inserting various types of recording media, such as a memory card, may be affixed to the top of the main control board 33. An insertion plug 42 for a network LAN connector or a peripheral USB connector may be mounted on one side or both sides of an LCD device 37.

Referring to FIGS. 7 and 8, the display cover 43 may comprise a storage depression 45 which opens towards the front and the top, an input key arrangement 46c adjacent to the front end of the storage depression 45, and input key arrangements 46a and 46b extending upwards on the left-right side of the storage depression 45. The LCD device 37 may be mounted to rotate up or down between a raised position and a lowered position. When the LCD device 37 is lowered, the LCD device 37 is stored in the storage depression 45, such that a display surface 37A faces upwards. At this time, the display surface 37A, the input key arrangements 46a and 46b, and the glass plate may be arranged on about the same plane.

Referring to FIG. 2, a plurality of control switches G comprising a plurality of input keys for activating the functions associated with the electrical device 1 may protrude from a corresponding one of openings 83c of the input key arrangement 46c. The input key arrangement 46c may define initial settings for the electronic device 1. Such initial settings may comprise settings for the electronic device 1, which are changed infrequently, or settings for functions of the electronic device 1, which functions are not used in normal operations; or both. In this embodiment, the contrast control keys G1 and G2, and the date/time control keys G3, G4, G5, may be arranged horizontally in a row. A group of control switches C and D comprising a plurality of input keys for the functions associated with the electronic device 1 may protrude from a corresponding one of openings 83a and 83b of the input key arrangements 46a and 46b, respectively. The group of control switches C on the right side may comprise a vertical column of input keys for selecting and displaying a desired function, for example a photo capture input key C1, a copy input key C2, a facsimile input key C3, or a scanner input key C4, or any combination thereof.

Figure 7A:
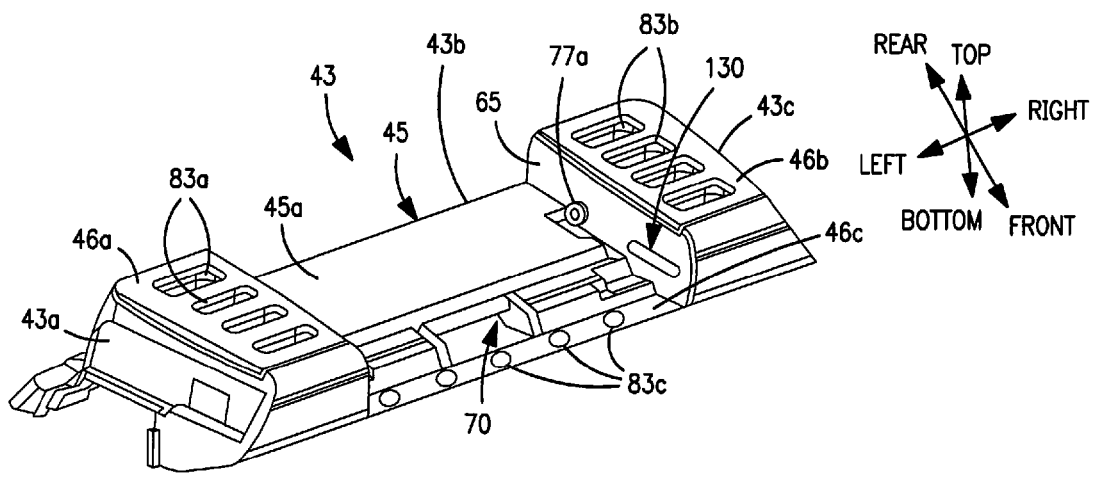
FIG. 7(a) is a left side, perspective view of a top of a display cover of the electronic device of FIG. 1.
Figure 7B:
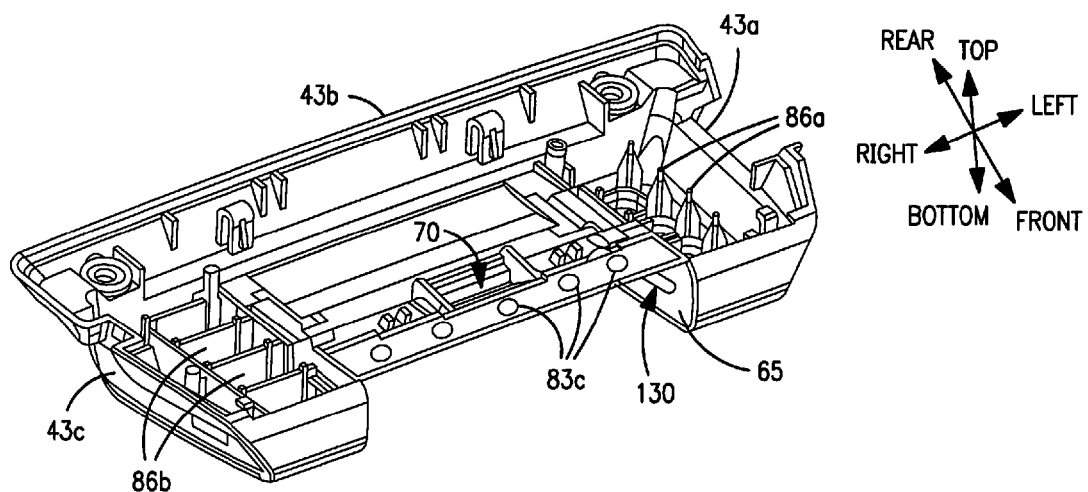
FIG. 7(b) is a left side, perspective view of an underside of the display cover of FIG. 7(a).
Figure 8A:
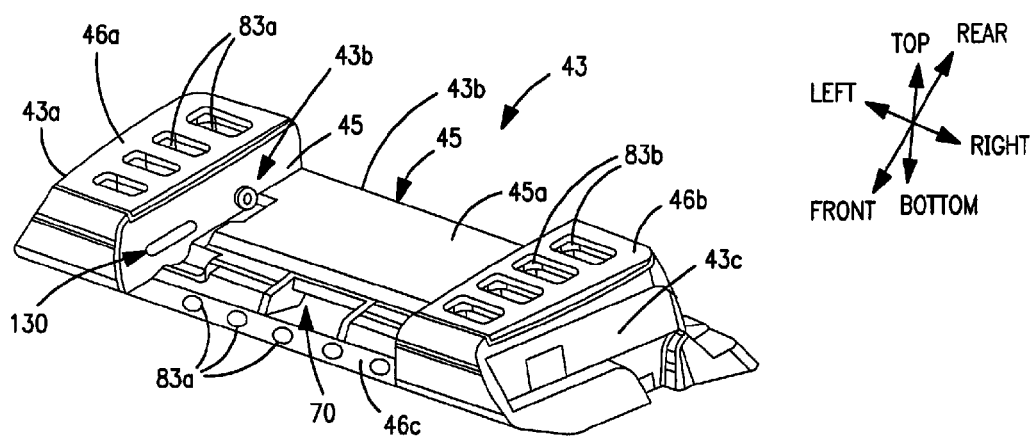
FIG. 8(a) is a right side, perspective view of the top of the display cover of FIG. 7(a).
Figure 8B:
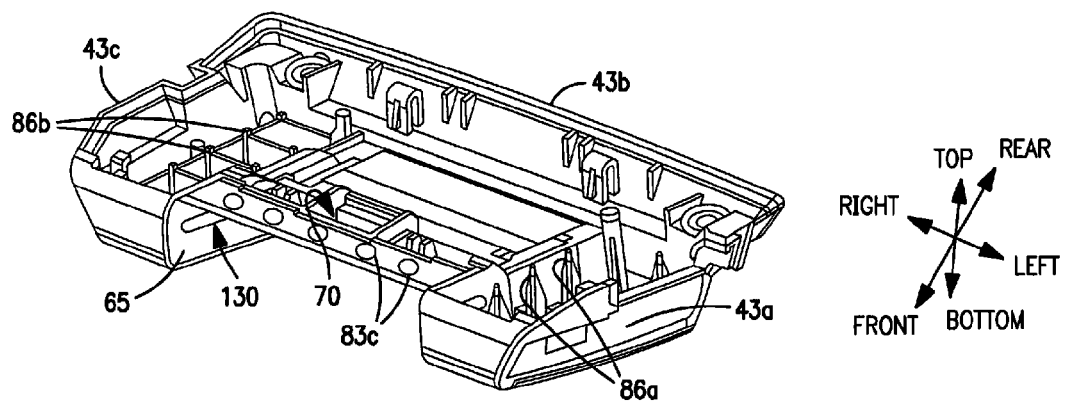
FIG. 8(b) is a right side, perspective view of the underside of the display cover of FIG. 7(a).

Moreover, as shown in FIG. 7(a) and FIG. 8(b), the interior surface of the input key arrangements 46a and 46b may be formed as a unit with a rib 86a and a rib 86b which may be positioned to enable the switches (not shown) to move in an up-down direction into each opening 83a and 83b. The rib 86b may form a substantially rectangular group of blocks to classify each control switch C1-C4 by its placement, and for each switch placement mounted on the surface of the switch substrate 40, a light source, e.g., LED 87, may be positioned in each block formed by the rib 86b. In operation, when one of the LEDs 87 emit light, only the control switch corresponding to the LED 87 which emits light also emits light.

Referring to FIG. 2, a notch-shaped, e.g., U-shaped, opening 44 may be formed on the side closest to the front on the top of the upper body 3. The opening 44 may be formed, such that the display surface 37A of the LCD device 37, the surface of the input key arrangements 46a and 46b of the display cover 43, and the group of control switches C and D, are visible when the upper body 3 is closed onto the top of the lower body 2 around the pivot of the upper body 3 corresponding to the lower body 2. Moreover, when the LCD device 37 is lowered and the upper body 3 is closed on top of the lower body 2, the display surface 37A of the LCD device 37, the top of the upper body 3, and the glass plate may be arranged in substantially a flat plane.

Referring to FIGS. 1 and 2, a control switch E may be positioned on the right side of the opening 44, and may comprise a start/stop input key, a color copy start input key, monochrome copy start input key, and a cross-shaped toggle input key for searching for pre-registered facsimile numbers, adjusting receiver volume, and the like. A control switch F may be positioned on the left side of the LCD device 37, and may comprise a keypad for inputting facsimile numbers, a key for outputting management reports, a facsimile number redial input key, or the like.

Moreover, referring to FIGS. 2, 7(a), 7(b), 8(a), and 8(b), when the upper body 3 is closed onto the lower body 2, the three sides 44a, 44b, and 44c of the notch shaped opening 44, which meet the three sides 43a, 43b and 43c of the free end of the LCD display 37 and the display cover 43, may form a trapezoid which is wider adjacent to the bottom of each side 43a, 43b, 43c, 44a, 44b, and 44c to prevent users from positioning their hand.

The input key arrangements 46a and 46b may be positioned on the left and right side of the LCD device 37, and may comprise a group of control switches C and D which act as a free space zone. Consequently, the notch-shaped opening 44 may not interfere with the LCD device 37 when the LCD device 37 is raised. In addition, the cover 7 may be positioned adjacent to the LCD device 37, such that the cover 7 may rotate up-down relative to the upper body 3 without contacting the LCD device 37 regardless of the position of the LCD device 37, i.e., the range of rotation of the cover 7 does not overlap with the range of rotation of the LCD device 37. Consequently, cover 7 may not damage the LCD device 37.

Figure 9B:
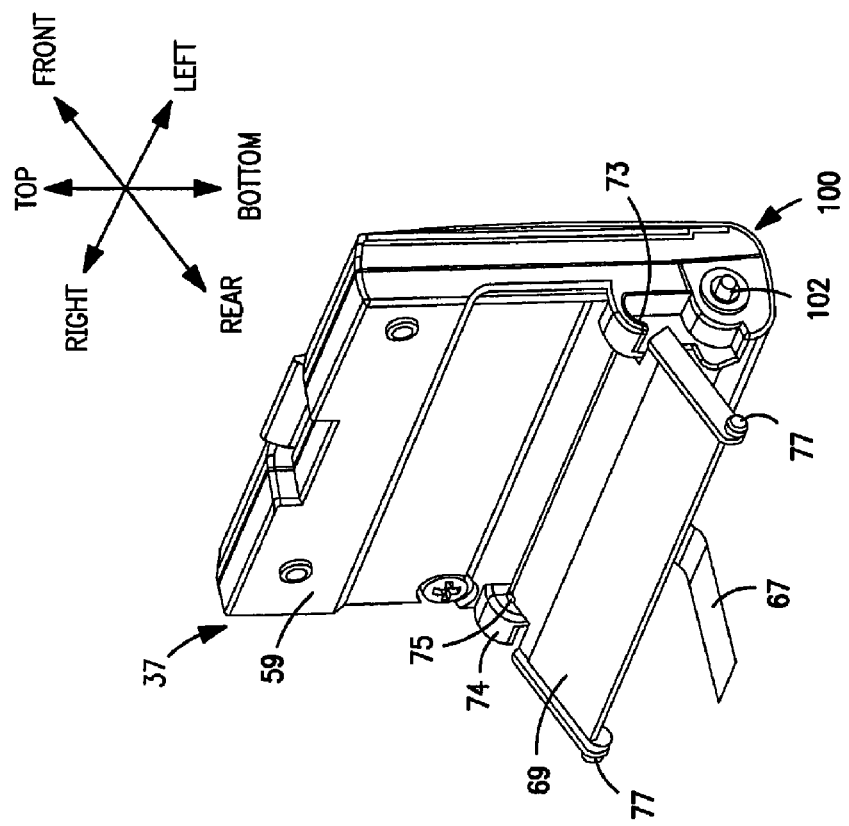
FIGS. 9(a) and 9(b) are perspective views of a liquid crystal display ("LCD") device of the electronic device of FIG. 1.
Figure 9A:
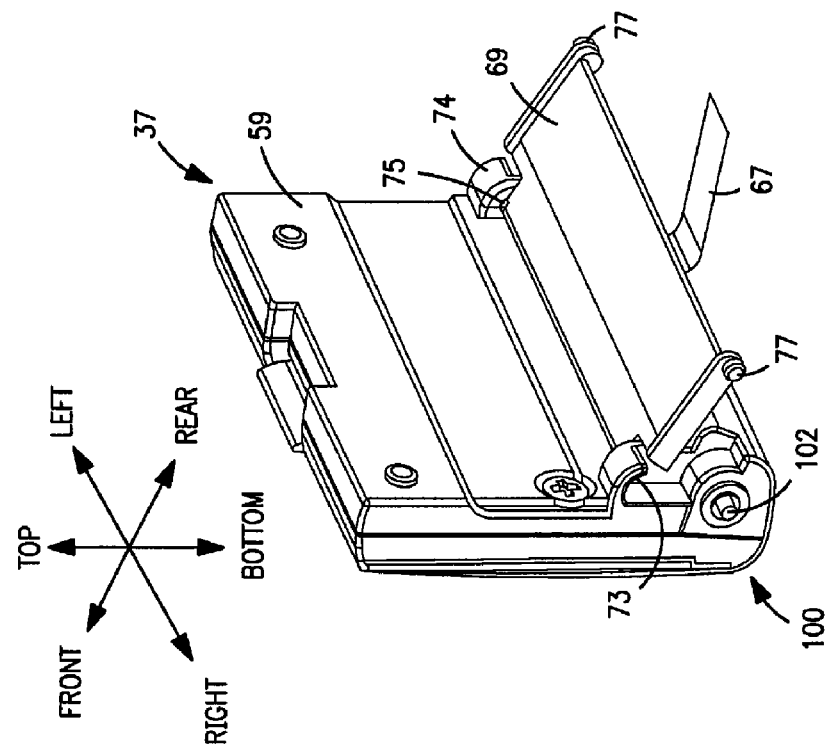

Referring to FIGS. 9 and 10, the LCD device 37 may comprise a semi-rectangular case 59, a rectangular display surface 37A formed onto the surface of the case 59, and a cover portion 69 connected to the rear of the case 59, such that it may rotate. Moreover, a flexible flat cable ("FFC") 67 extends from the vicinity of the lower edge of the rear of the case 59.

Figure 14:
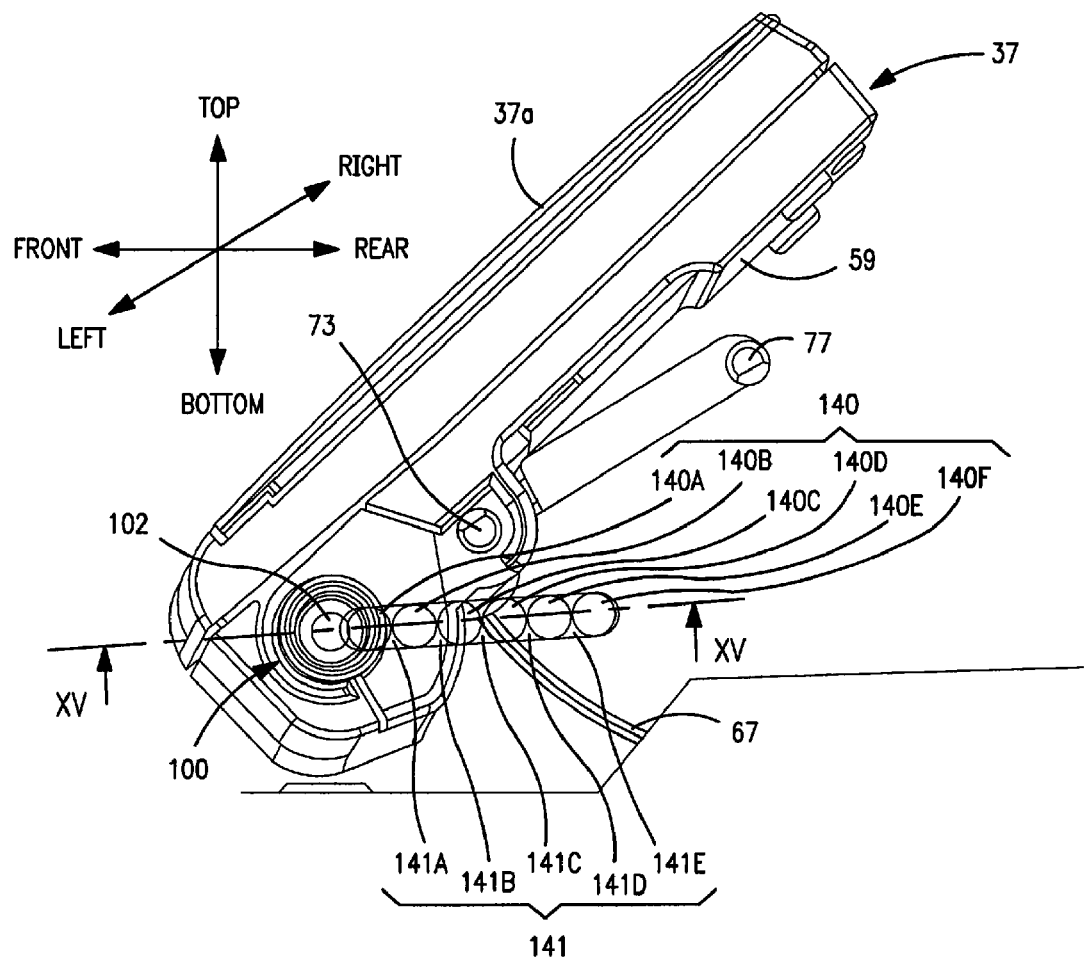
FIG. 14 is a schematic drawing depicting a mounting of the LCD device onto the display cover.

Referring to FIG. 10, the display surface 37A may have a relatively large display surface area, e.g., a 42 mm×54 mm display area, which is configured to display a color image. An angle regulator may regulate a pivotal angle between the LCD device 37 and the display cover surface 45a. The angle regulator may comprise the cover plate 69 and the pair of support shafts 77. The cover portion 69 may be a single unit comprising a flexible synthetic resin plate. A first end of the cover portion 69 may be connected pivotally to the rear of the case 59 and a second end of the cover portion 69 may be connected pivotally to the display cover 43. At least one support portion 100 is provided at the LCD display 37 and comprises a slide shaft 102. When the slide shaft 102 of the at least one support portion 100 is conveyed in at least one guide groove 130 from a first location to a second location, the regulator pivots about its second end. The second end of the regulator is disposed closer to the second location than to the first location, e.g., the second end of the regulator is connected pivotally proximate to the second location. When the slide shaft 102 of the at least one support portion 100 is in the first location, a plane defined by the cover portion 69 is substantially parallel to the display surface 37A. A pair of pivot pins 73 may protrude outwards from each other on the first end ("the base end") of the cover portion 69, and a pair of support shafts 77 may protrude outwards from each other on the second end ("the free end"). Referring to FIGS. 9, 10, and 14, the pivot pins 73 may be configured to rotate in a pair of collets 75 on bosses 74 formed on the rear of the case 59.

A pair of support portions 100 may be mounted on both sides of the case 59, and the LCD device 37 may be rotated up or down with respect to the display cover 43 by slide shafts 102 mounted on each of the support portions 100. Referring to FIG. 18, the support portions 100 may operate in conjunction with a pair of support shafts 77 mounted on the free end of the cover portion 69.

The LCD device 37 may be electrically connected to a main control board 33 via the FFC 67. In this embodiment, FFC 67 is connected to a main control board 33 via a first hole 70, a second hole 71, and a third hole 72. Referring to FIGS. 7 and 8, the first hole 70 may be is a semi-rectangular hole formed as a notch in the front tip of a display cover surface 45a of the storage depression 45 in the display cover 43. Referring to FIG. 4, the second hole 71 may be a semi-rectangular hole which overlaps with the first hole 70 via the upper cover 41 on the bottom of the display cover 43. Referring to FIGS. 4 and 6, the third hole 72 may be a hole formed as a notch in the upper plate portion 32a of the shield case. Consequently, the signal for display images is transmitted to the LCD device 37 from the main control board 33 via the FFC 67.

Referring to FIGS. 9-12, the support portion 100 may comprise a slide shaft 102, a spring portion 104 that pushes the slide shaft 102, a bore-shaped hole 106 which stores the slide shaft 102 and the spring portion 104, and a cap 110 that fits over the hole 106 to enclose the slide shaft 102 and the spring portion 104 in the hole 106.

The slide shaft 102 may comprise a round base 112 and a cylindrical shaft 114 extending perpendicular to the base 112, and a semi-hemispheric tip 116 may be formed on the tip of the shaft 114.

The hole 106 may comprise a cylindrical wall 120 and a locking depression 122 adjacent to the wall 120. Moreover, a floor 124 may be mounted adjacent to the wall 120.

The cap 110 may comprise a round contact 126 and a hook 128 formed as portion of the contact 126 to prevent the cap from being removed. A shaft hole 150 may be formed onto the cap 110 for inserting the shaft 114 of the slide shaft 102.

In order to assemble the support portion 100, first, the spring portion 104 is inserted into the hole 106. Next, the tip 116 of the slide shaft 102 is inserted into the shaft hole 150 of the cap 110.

When the cap 110 is fitted into the hole 106 from the side of the hook 128 while the spring portion 104 is in the hole 106 and the slide shaft 102 is in the cap 110, the joint depressions 122 mounted on the hook 128 and the hole 106 fit together, thereby joining together the cap 110 and the hole 106. When the cap 110 is mounted onto the hole 106, a portion of the slide shaft 102 protrudes from both sides of the LCD device 37. Consequently, the slide shaft 102 is fitted onto the hole 106, and is pressed by the spring portion 104 in the left-right direction of the LCD device 37.

With respect to the display cover 43, referring to FIGS. 7 and 8, a pair of guide grooves 130 may be mounted extending in the front-rear direction in the corner where the left-right side of the display cover surface 45a of the storage depression 45 in the display cover 43 and the linkage wall 65 of the pair of left-right input key positioning 46a and 46b meet.

Figure 13:
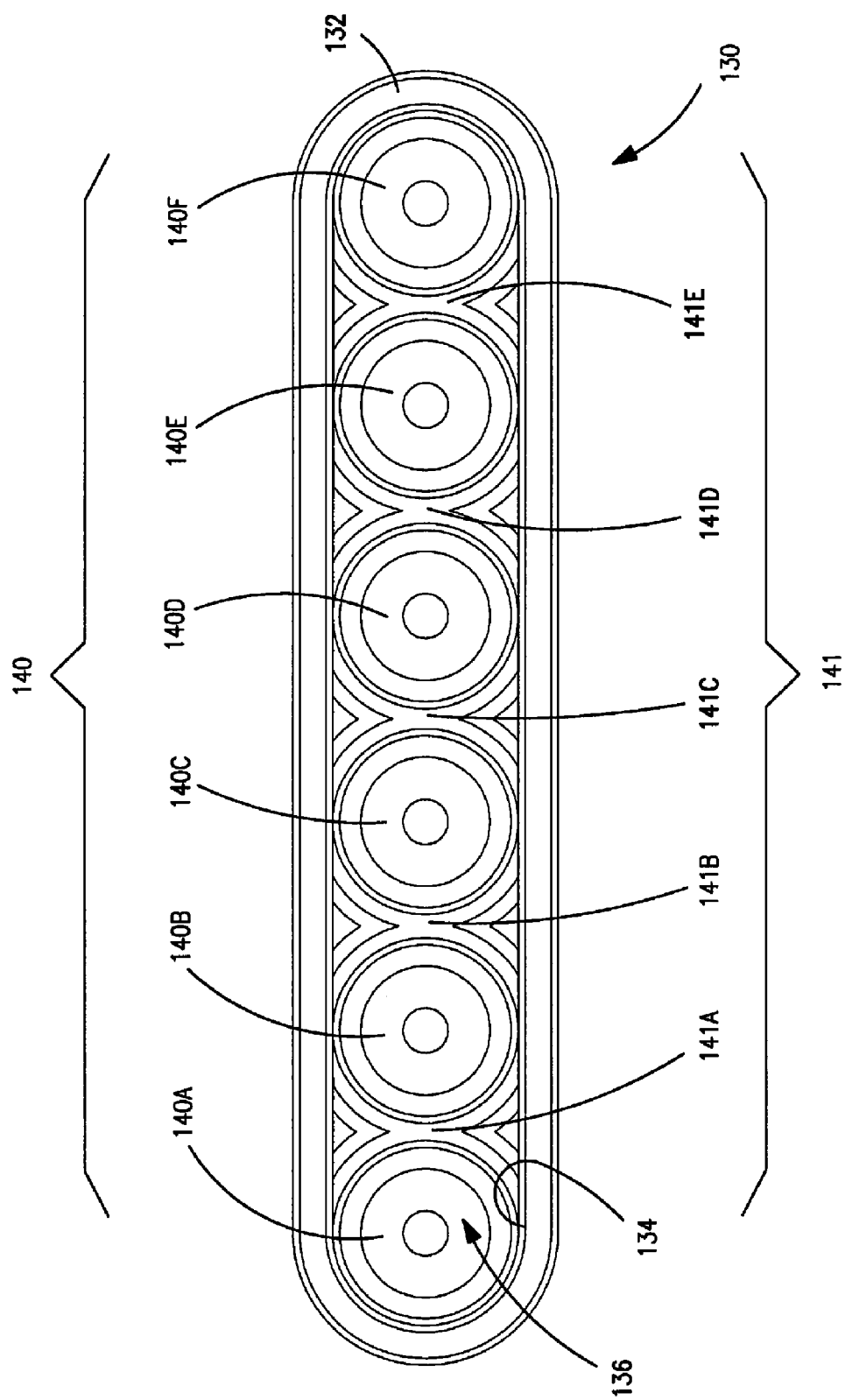
FIG. 13 is a schematic drawing of a guide groove of the electronic device.
Figure 16:
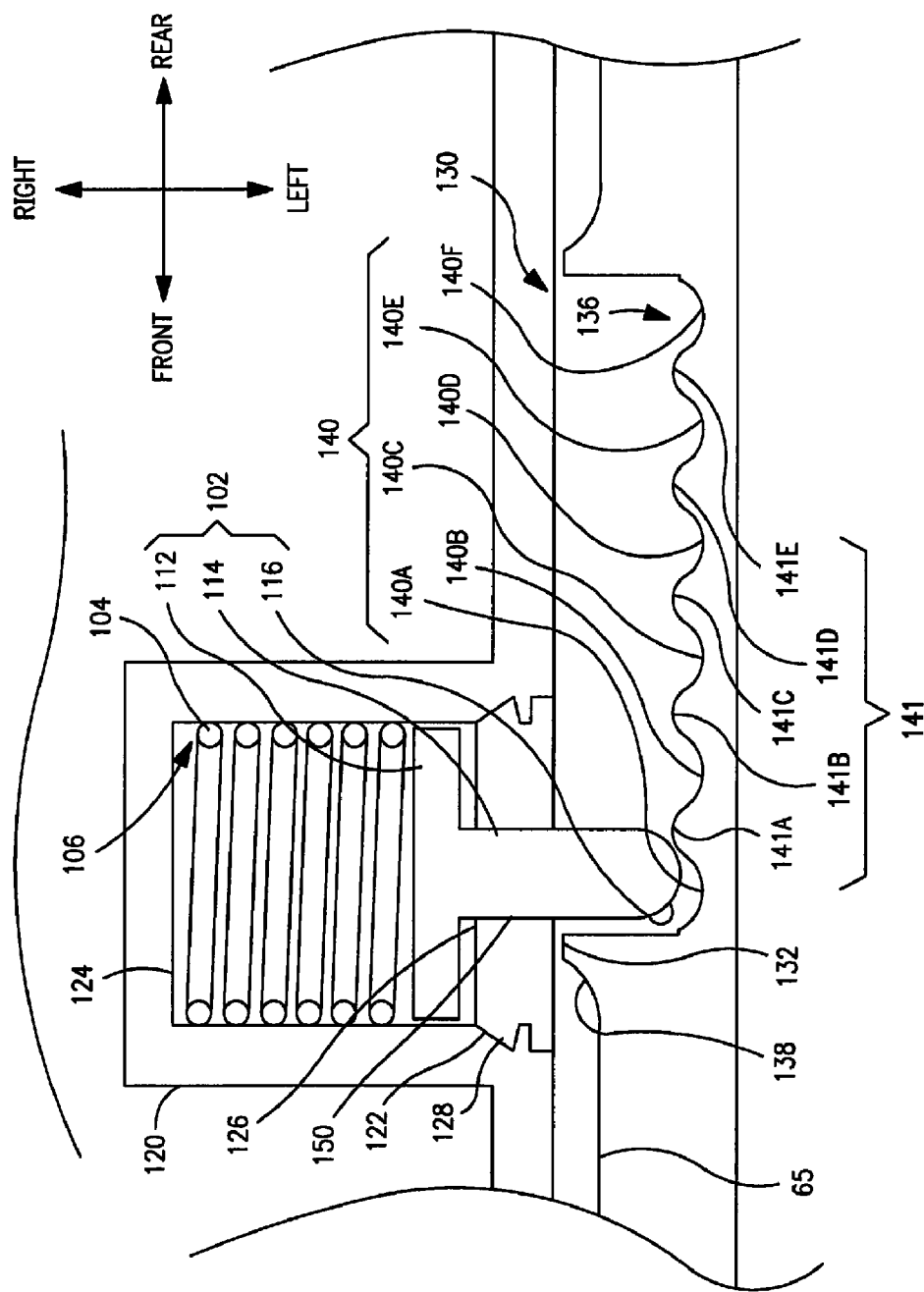
FIG. 16 is a schematic drawing of the support portion and the guide groove.

Referring to FIGS. 13 and 16, the guide grooves 130 may comprise a frame 132 which protrudes from the linkage wall 65 of the display cover 43, an interior surface 134 which meets the exterior surface of the slide shaft 102 when it is inserted into the guide groove 130, and a contact curve 136 contacts the tip 116 when the slide shaft 102 is inserted into the guide groove 130.

The curve surface 136 may comprise a plurality of depressions 140, e.g., depression 140A, depression 140B, depression 140C, depression 140D, depression 140E, and depression 140F, and a plurality of protrusions 141, e.g., protrusion 141A, protrusion 141B, protrusion 141C, protrusion 141D, and protrusion 141E.

Figure 15:
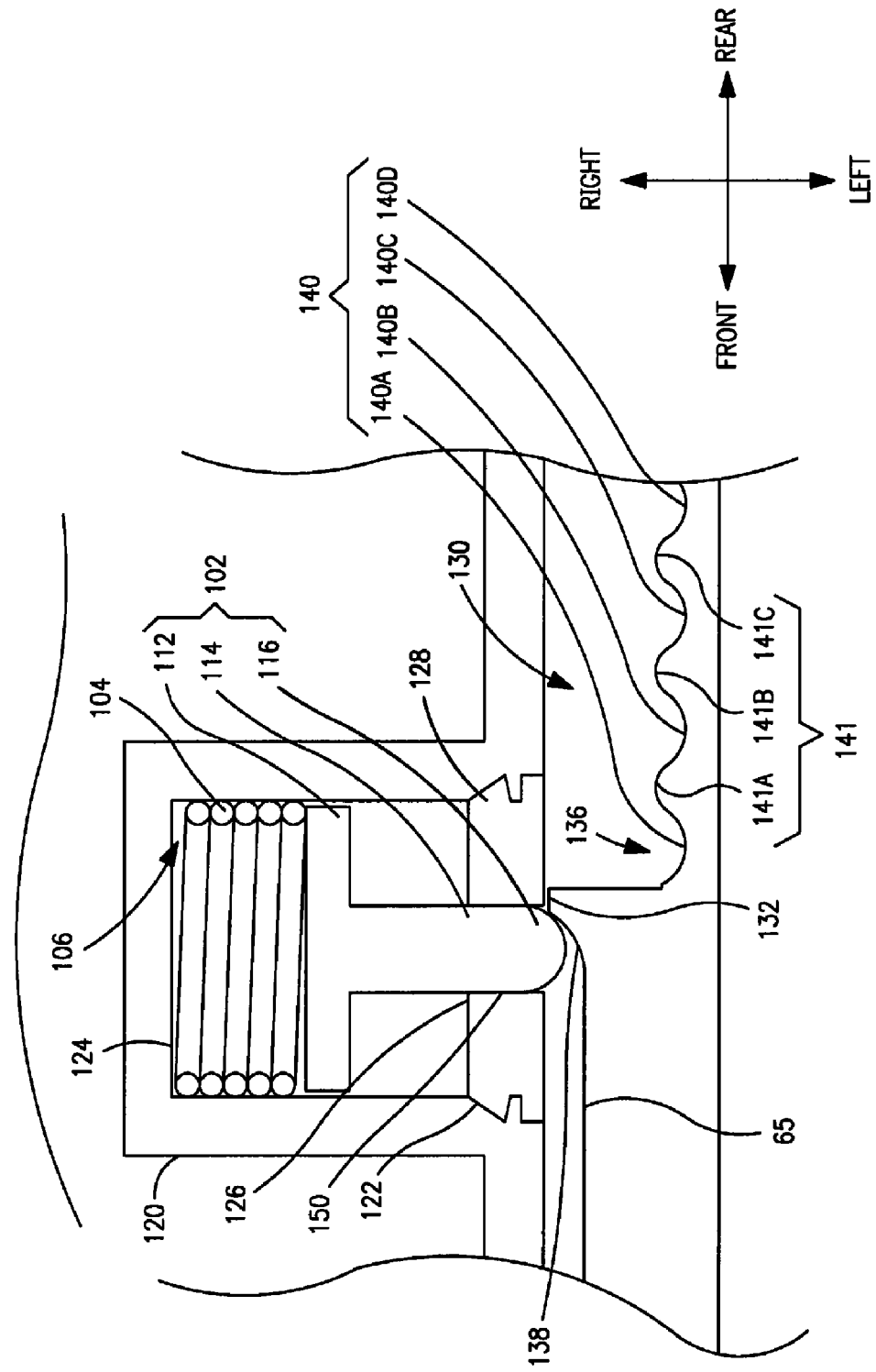
FIG. 15 is a partially, magnified cross-sectional taken along the line XV-XV line in FIG. 14.

Moreover, referring to FIGS. 15 and 16, a slope 138 connecting the linkage wall and the frame 132 of the input key arrangements 46a and 46b may be mounted adjacent to the frame 132.

Referring to FIGS. 14-16, with respect to mounting the LCD device 37 onto the display cover 43, both sides of the LCD device 37 may be stored in the storage depression 45 of the display cover 43, such that both sides of the LCD device 37 meet with the left and right linkage walls 65 of the display cover 43. At this time, if the LCD device 37 is stored into the display cover 43 by pushing each slide shaft 102 against the force of the spring 104 towards the side of the LCD device 37, the tip 116 of the slide shaft 102 contacts the corresponding linkage wall 65.

Figure 11:
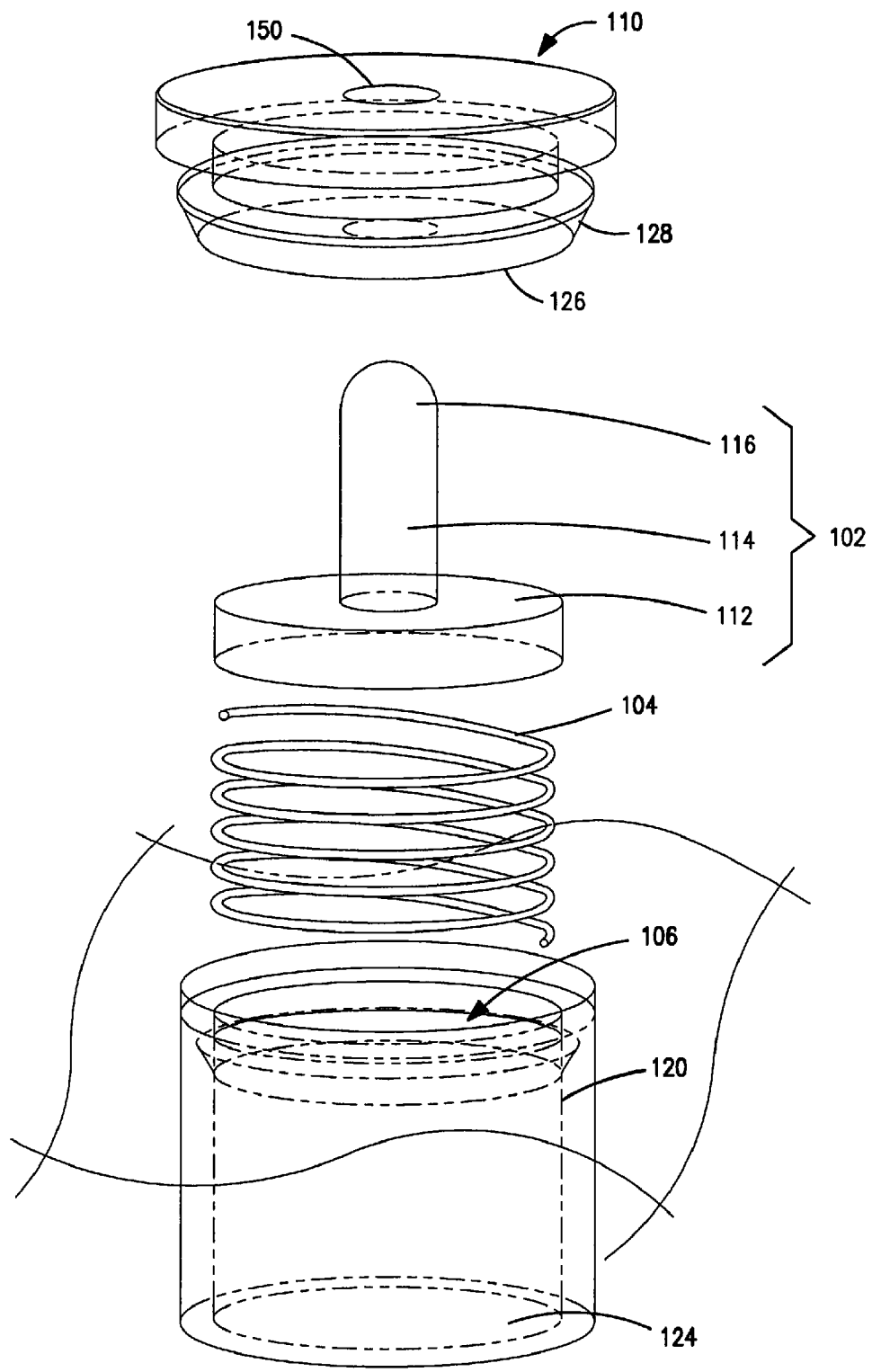
FIG. 11 is an expanded, schematic drawing of a support portion of the electronic device of FIG. 1.
Figure 12:
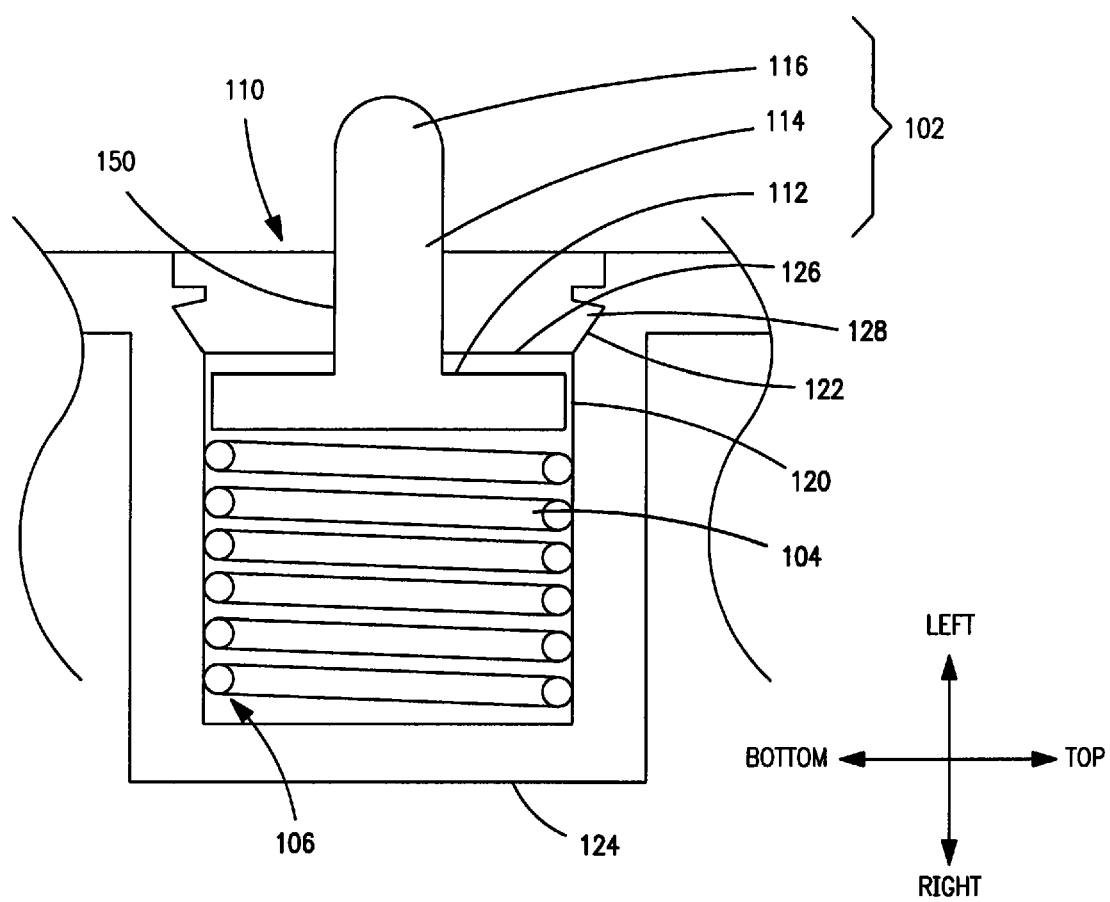
FIG. 12 is a magnified, cross-sectional taken along the line XII-XII line in FIG. 10(a).

If the LCD device 37 then is slid into the storage depression 45 on the display cover 43 while the tip 116 of the slide shaft 102 is in contact with the linkage wall 65, the slide shaft 102 will attain the slope 138. The slide shaft 102 will be guided by the slope 138 and will pass the frame 132, and will be inserted into the guide groove 130. Referring to FIGS. 11, 12, and 16, the tip 116 of the slide shaft 102 may have a semi-hemispherical shape, such that it may reach the guide groove 130 without being caught by the linkage wall 65, the slope 138 or the frame 132. Consequently, the LCD device 37 may be smoothly inserted into the display cover 43. At this time, each of the left-right slide shaft 102 tips 118 may be pushed against and brought into contact with the contact curve 136 by the force of the spring portion 104. Because the slide shaft 102 is pressed by the spring portion 104, the slide shaft 102 may not accidentally be displaced from the guide groove 130 after the slide shaft 102 has been inserted into the guide groove 130.

Referring to FIGS. 9 and 10, with respect to mounting the cover portion 69 onto the LCD device 37, the pivot pin 73 and support shaft 77 of the cover portion 69 may be a semicircle. Because the cover portion 69 is flexible, the central portion may be warped in the left-right direction to reduce the distance between the pair of pivot pins 73 and the distance between the pair of support shafts 77, and thereby facilitate insertion of the pair of pivot pins 73 and support shafts 77 into the corresponding pair of collets 75 and support holes 77a. At this time, as shown in FIGS. 9, 10, 14, and 18, the FFC 67 extends outwards from near the lower end of the rear of the case 59, so it is covered and protected by the cover portion 69.

In this way, the slide shafts 102 are configured to move in the forward-rear direction by a pair of left-right guide grooves 130 mounted on the display cover 43, and the support shafts 77 are supported by a pair of left-right support holes 77a mounted on the display cover 43.

Figure 17A:
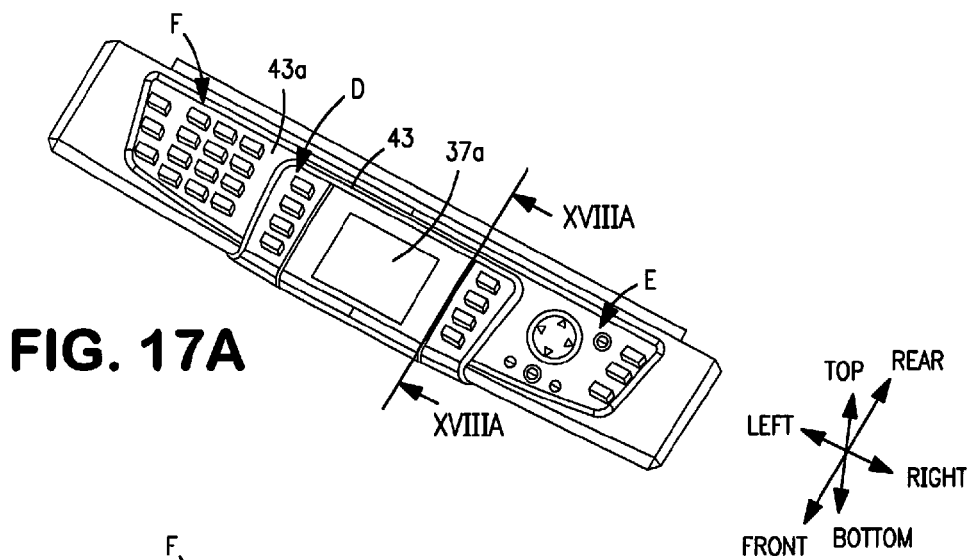
FIG. 17(a) is a partially, magnified cross-sectional view of a display support when the LCD device is in a lowered position.
Figure 17B:
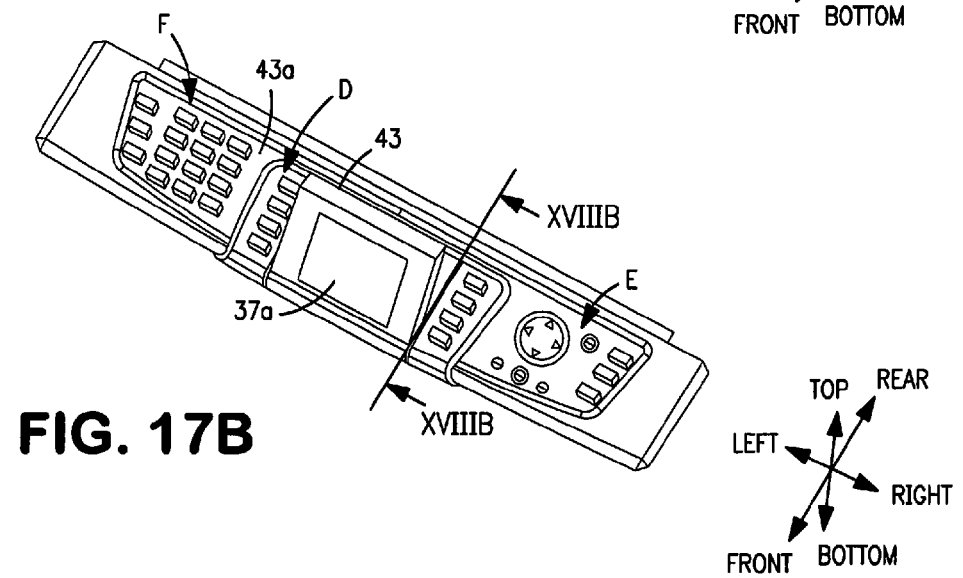
FIG. 17(b) is a partially, magnified cross-sectional view of the display support when the LCD device is in an intermediate position between the lowered position and a raised position.
Figure 17C:
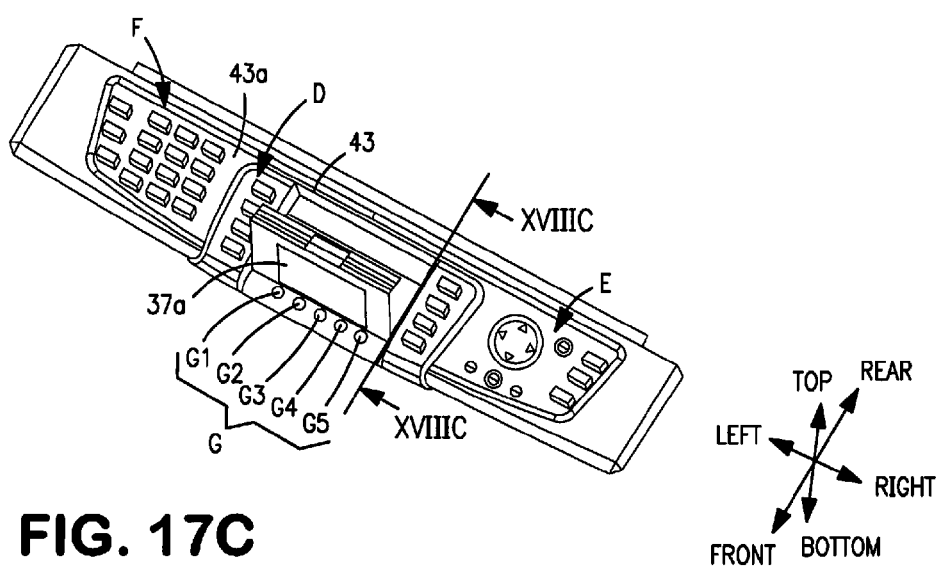
FIG. 17(c) is a partially, magnified cross-sectional view of the display support when the LCD device is in the raised position.

Referring to FIGS. 17 and 18, with respect to raising and lowering the LCD device 37, when the LCD device 37 is moved from a position where the display surface 37A faces upwards, e.g., a lowered position, to a substantially upright position, e.g., a raised position, a left-right pair of slide shafts 102 move from the front end to the rear end of a guide groove 130. At this time, a left-right pair of slide shaft 102 tips 118 contact the contact curve 136, going sequentially from depression 140A to protrusion 141A, to depression 140B, to protrusion 141B, to depression 140C, to protrusion 141C, to depression 140D, to protrusion 141D, to depression 140E to protrusion 141E until they reach depression 140F. The tips 118 are each pressed against the contact curve 136 by the spring portion 104, such that the LCD device 37 is maintained in that position when the tips 118 contact the depressions 140.

Specifically, referring to FIGS. 13, 16, 17, and 18, in this embodiment, the LCD device 37 may be maintained in one of six different positions when the tips 118 are at depression 140A, depression 140B, depression 140C, depression 140D, depression 140E, or depression 140F, respectively.

Figure 19A:
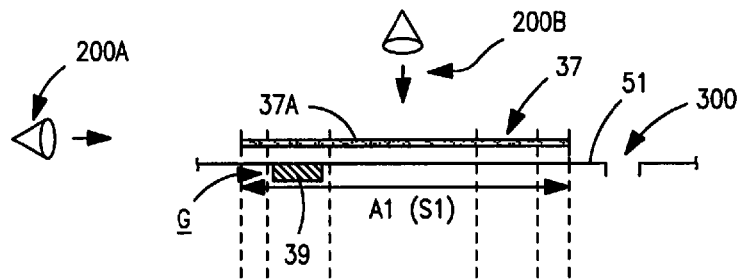
FIGS. 19(a)-19(c) are diagrams illustrating a change in a projected area and a location of switches when the LCD device changes position.
Figure 19B:
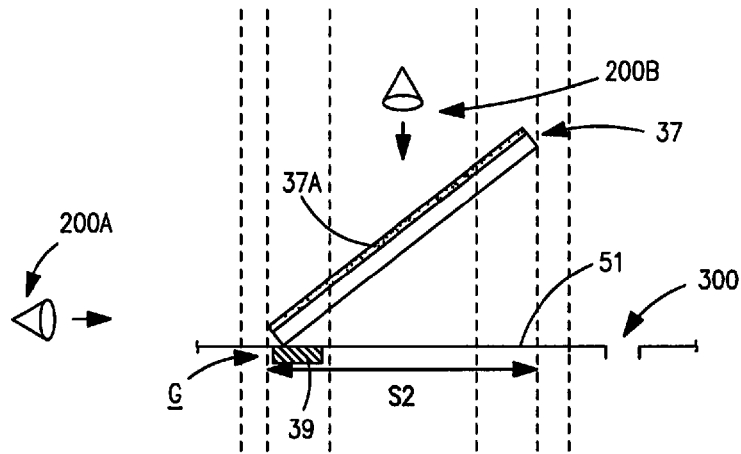

Referring to FIG. 19(a), when the LCD device 37 is lowered, the display surface 37A may be viewed from user viewpoint 200A. At this time, switch G is covered by the LCD device 37, such that switch G may not be viewed from the user viewpoint 200A. Moreover, referring to FIG. 19(b), even if the LCD device 37 is partially raised, the display surface 37A may be viewed from the user viewpoint 200A. At this time, switch G is visible near the display surface 37A. Consequently, when the LCD device 37 is raised, the display surface 37A and switch G may be viewed from the user viewpoint 200A. Consequently, users may perform input to switch G accurately because the user may view the display surface 37A while operating switch G.

In this way, the user may view the display surface 37A at any given time while the position of the LCD device 37 is changed from the lowered position to the raised position.

Moreover, when the LCD device 37 is lowered and the upper body 3 is closed onto the lower body 2, the display surface 37 of the LCD device 37A, the top of the upper body 3, and the glass plate may be positioned on substantially the same plane. Consequently, even if a document were to protrude from the glass plate in the forward direction in FIG. 1, the document still may be positioned flush with the glass surface.

Figure 19C:
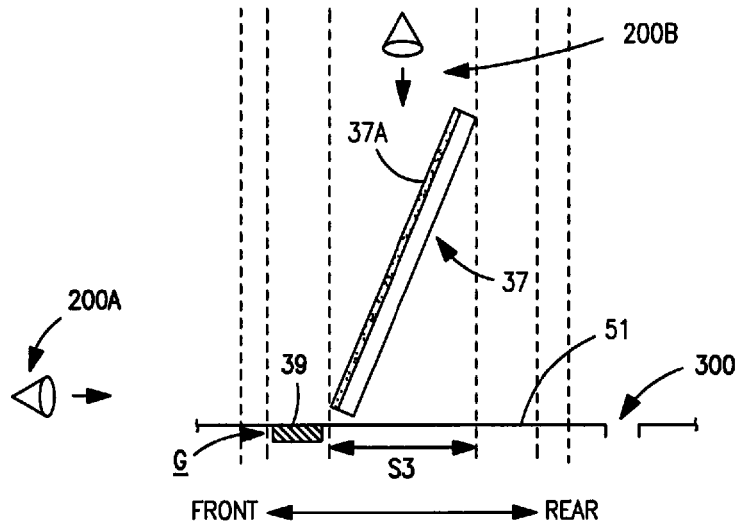
Figure 20:
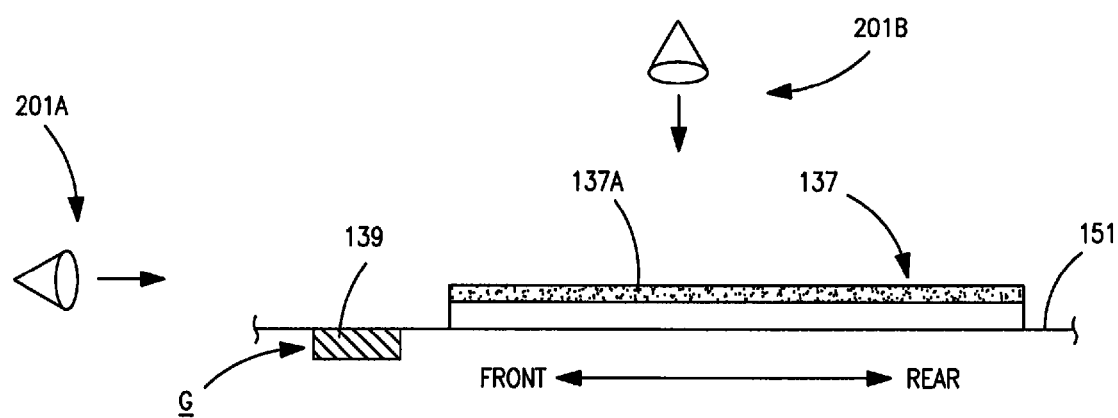
FIG. 20 is a diagram of a known LCD device.
Figure 21A:
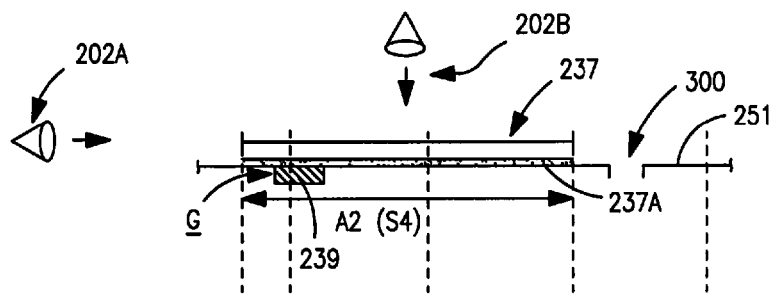
FIGS. 21(a)-21(c) are diagrams of another known LCD device.
Figure 21B:
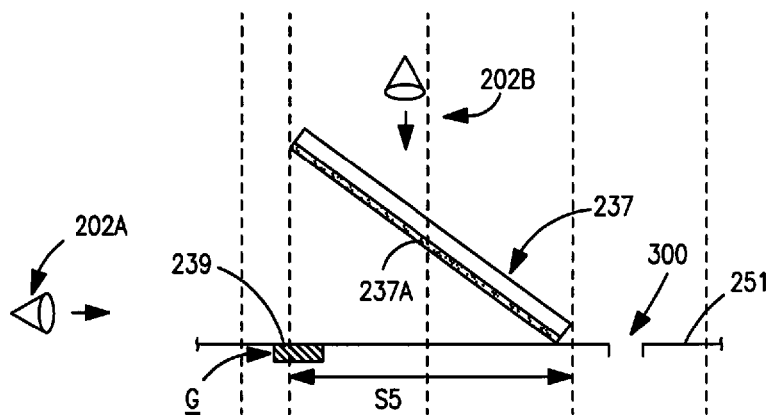
Figure 21C:
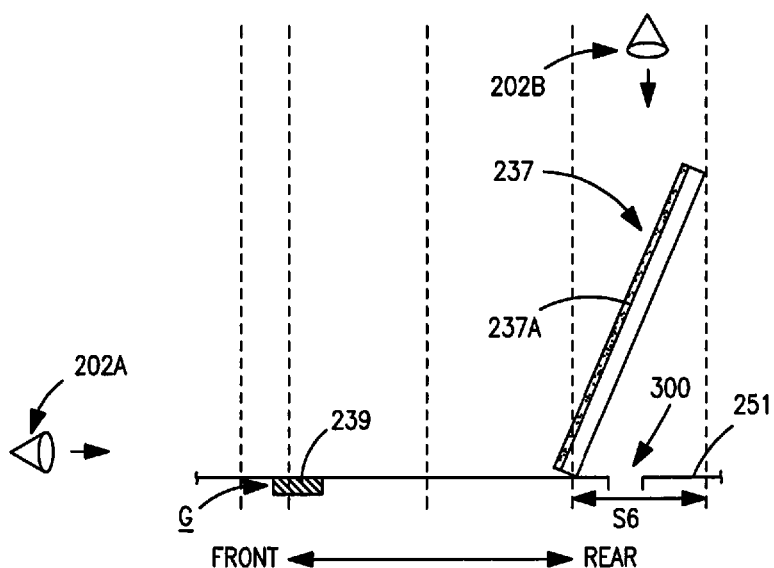
Figure 22A:
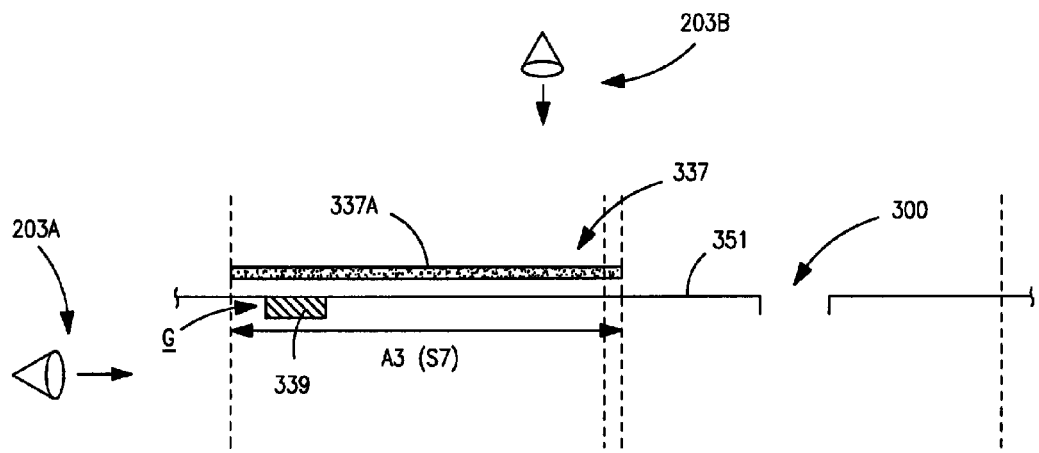
FIGS. 22(*a*) and 22(*b*) are diagrams of yet another known LCD device.
Figure 22B:
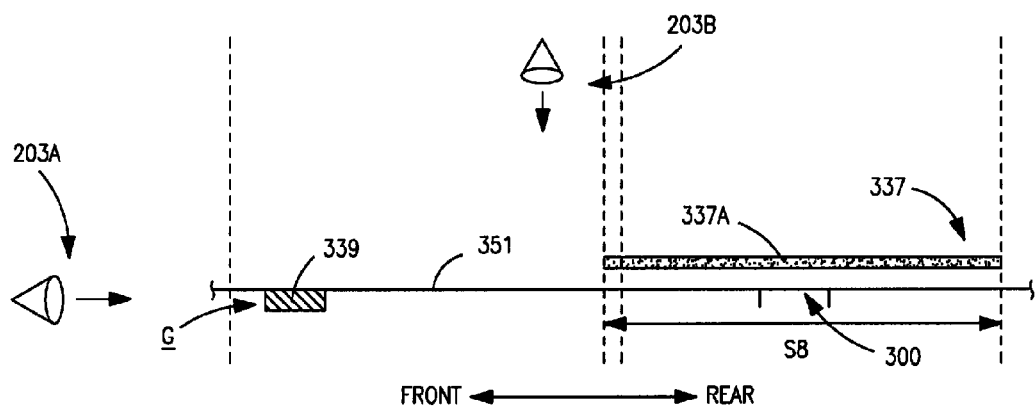

Referring to FIG. 19, with respect to the change in the projected area accompanying raising and the lowering of the LCD device 37, when the LCD device 37 is lowered with respect to the housing surface as viewpoint 200B, the area projected from viewpoint 200B will be the projected area S1. The projected area S1 may be about equal to the mounting area A1 required to place the LCD device 37 and control G on the housing surface 51.

Moreover, when the LCD device 37 is raised, the area projected from the same viewpoint 200B will be the projected area S3. When the position of the LCD device 37 is changed from the lowered position to the raised position, the projected area changes from projected area S1 to projected area S2 to projected area S3. At this time, the projected area for each of these states is contained within the range of projected area S1 when the LCD device 37 is in the lowered position, e.g., because the range of rotation of the display 37 may be less than or equal to 90 degrees. Specifically, when the LCD device 37 goes from the lowered position to the raised position, the area projected from the viewpoint 200B is included in the projected area S1 when the LCD device 37 is lowered.

Consequently, the viewer may view the other portion 300 from viewpoint 200B independent of the position of the LCD device 37. Moreover, if the other portion 300 is a recording medium feed, then the recording medium feed may be positioned directly behind the mounting area A1, which reduces the size of the electronic device 1.

While the invention has been described in connection with exemplary embodiments, it will be understood by those skilled in the art that other variations and modifications of the exemplary embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the flowing claims.

What is claimed is:

1. A display support comprising:
a display cover comprising a display cover surface and at least one guide groove formed therein;
a display pivotally mounted by at least one support portion on the display cover and configured to pivot between a first display position and a second display position; and
an input key disposed on the display cover surface and covered by the display when the display is in the first display position;
wherein a back surface of the display, opposite to a display surface, faces the input key when the display is in the first display position,
wherein the at least one guide groove is configured to guide the at least one support portion from a first location to a second location as the display pivots from the first display position to the second display position, such that the display uncovers the input key when the at least one support portion is at the second location,
wherein the input key is disposed below the at least one guide groove,
wherein, when the display pivots from the first display position to the second display position, a base end of the display moves from a first base end position to a second base end position, and a free end of the display moves from a first free end position to a second free end position, and
wherein the display and the at least one guide groove are configured such that the second base end position, the second free end position, and the input key are positioned between the first base end position and the first free end position in a predetermined direction which is parallel to the display surface of the display when the display is in the first display position and is inclined to the display surface of the display when the display is in the second display position, and such that the second base end position is closer to the input key than the second free end position in the predetermined direction, a direction perpendicular to the predetermined direction being parallel to the display surface of the display both when the display is in the first display position and when the display is in the second display position.

2. The display support of claim 1, each of the at least one guide groove comprising a conveyance path which is substantially parallel to the display cover surface.

3. The display support of claim 1, each of the at least one guide groove comprising a plurality of depressions between the first location and the second location.

4. The display support of claim 1, the at least one support portion comprising a slide shaft and urging means and the at least one guide groove comprising a plurality of depressions, such that the urging means urges the slide shaft into at least one of the plurality of depressions.

5. The display support of claim 1, further comprising an angle regulator that is configured to regulate an angle between the display and the display cover surface, the angle regulator comprising a first end which is pivotally connected to the display and a second end which is pivotally connected to the display cover and is proximate to the second location.

6. An electronic device comprising a housing and a display support, the display support comprising:
a display cover comprising a display cover surface and at least one guide groove formed therein;
a display pivotally mounted by at least one support portion on the display cover and configured to pivot between a first display position and a second display position; and an input key disposed on the display cover surface and covered by the display when the display is in the first display position;

wherein a back surface of the display, opposite to a display surface, faces the input key when the display is in the first display position, wherein the at least one guide groove is configured to guide the at least one support portion from a first location to a second location as the display pivots from the first display position to the second display position, such that the display uncovers the input key when the at least one support portion is at the second location, wherein the input key is disposed below the at least one guide groove, wherein, when the display pivots from the first display position to the second display position, a base end of the display moves from a first base end position to a second base end position, and a free end of the display moves from a first free end position to a second free end position, and wherein the display and the at least one guide groove are configured such that the second base end position, the second free end position, and the input key are positioned between the first base end position and the first free end position in a predetermined direction which is parallel to the display surface of the display when the display is in the first display position and is inclined to the display surface of the display when the display is in the second display position, and such that the second base end position is closer to the input key than the second free end position in the predetermined direction, a direction perpendicular to the predetermined direction being parallel to the display surface of the display both when the display is in the first display position and when the display is in the second display position.

7. The display support of claim 1, wherein the input key comprises a control key for controlling the display.

8. The display support of claim 1, wherein the input key is disposed between the first base end position and the second base end position in the direction parallel to the display surface of the display when disposed in the first display position.

9. The display support of claim 1, wherein the display and the at least one guide groove are configured such that while the display pivots between the first display position and the second display position, the base end and the free end of the display are maintained between the first base end position and the first free end position in the predetermined direction.

* * * * *